US010191654B2

(12) United States Patent
Clements et al.

(10) Patent No.: US 10,191,654 B2
(45) Date of Patent: Jan. 29, 2019

(54) SYSTEM AND METHOD FOR INPUTTING TEXT INTO ELECTRONIC DEVICES

(71) Applicant: TouchType Limited, London (GB)

(72) Inventors: Adam Clements, London (GB); Richard Tunnicliffe, London (GB); Benjamin William Medlock, London (GB)

(73) Assignee: TOUCHTYPE LIMITED, London (GB)

( * ) Notice: Subject to any disclaimer, the term of this patent is extended or adjusted under 35 U.S.C. 154(b) by 645 days.

(21) Appl. No.: 14/714,174

(22) Filed: May 15, 2015

(65) Prior Publication Data

US 2015/0317069 A1    Nov. 5, 2015

Related U.S. Application Data

(63) Continuation-in-part of application No. 13/262,190, filed as application No. PCT/GB2010/000622 on Mar. 30, 2010, now Pat. No. 9,659,002.

(30) Foreign Application Priority Data

Mar. 30, 2009   (GB) .................................. 0905457.8

(51) Int. Cl.
*G06F 3/023* (2006.01)
*G06F 3/0488* (2013.01)
(Continued)

(52) U.S. Cl.
CPC ........ *G06F 3/04886* (2013.01); *G06F 3/0237* (2013.01); *G06F 3/04842* (2013.01);
(Continued)

(58) Field of Classification Search
CPC ............. G06F 3/04842; G06F 3/04886; G06F 3/0237; G06F 17/276; G06F 3/023; G06F 3/04883; G06F 17/24
See application file for complete search history.

(56) References Cited

U.S. PATENT DOCUMENTS 5,467,425 A  11/1995  Lau et al.
5,477,451 A  12/1995  Brown et al.
(Continued)

FOREIGN PATENT DOCUMENTS

CN         1703664 A    11/2005
CN       101203849 A     6/2008
(Continued)

OTHER PUBLICATIONS

U.S. Appl. No. 15/493,028; Non-Final Office Action; dated Jul. 10, 2017; 15 pages.
(Continued)

*Primary Examiner* — Shen Shiau
(74) *Attorney, Agent, or Firm* — Schwegman Lundberg & Woessner, P.A.

(57) ABSTRACT

A system comprising: one or more processors; and program instructions for providing a user interface. Execution of the program instructions by the one or more processors causes the one or more processors to display a user interface comprising: an entry mechanism for entering an input comprising at least one character, symbol, numeral or punctuation mark; a typing pane configured to display the input entered via the entry mechanism; wherein, in response to selection of a prediction based on the input entered via the entry mechanism, the typing pane is configured to replace the input entered via the entry mechanism by the prediction; and an undo button, wherein in response to user selection of the undo button, the typing pane is configured to replace the
(Continued)

selected prediction by the input entered via the entry mechanism.

18 Claims, 17 Drawing Sheets

(51) Int. Cl.
  *G06F 3/0484* (2013.01)
  *G06F 17/27* (2006.01)
  *G06F 17/24* (2006.01)
(52) U.S. Cl.
  CPC ............ *G06F 17/276* (2013.01); *G06F 3/023* (2013.01); *G06F 3/04883* (2013.01); *G06F 17/24* (2013.01)

(56) References Cited

U.S. PATENT DOCUMENTS

| | | | |
|---|---|---|---|
| 5,612,690 A | 3/1997 | Levy | |
| 5,671,426 A | 9/1997 | Armstrong, III | |
| 5,680,511 A | 10/1997 | Baker et al. | |
| 5,768,603 A | 6/1998 | Brown et al. | |
| 5,797,098 A * | 8/1998 | Schroeder ............ G06F 3/0237 379/355.05 | |
| 5,805,832 A | 9/1998 | Brown et al. | |
| 5,805,911 A | 9/1998 | Miller | |
| 5,806,021 A | 9/1998 | Chen et al. | |
| 5,896,321 A | 4/1999 | Miller et al. | |
| 5,940,847 A * | 8/1999 | Fein ........................ G06F 17/21 715/236 | |
| 5,952,942 A | 9/1999 | Balakrishnan et al. | |
| 5,963,671 A | 10/1999 | Comerford et al. | |
| 6,009,444 A | 12/1999 | Chen | |
| 6,011,554 A | 1/2000 | King et al. | |
| 6,047,300 A * | 4/2000 | Walfish ................. G06F 17/273 715/257 | |
| 6,052,657 A | 4/2000 | Yamron et al. | |
| 6,054,941 A | 4/2000 | Chen | |
| 6,104,989 A | 8/2000 | Kanevsky et al. | |
| 6,125,342 A | 9/2000 | Selesky | |
| 6,167,377 A | 12/2000 | Gillick et al. | |
| 6,182,027 B1 | 1/2001 | Nasukawa et al. | |
| 6,204,848 B1 | 3/2001 | Nowlan et al. | |
| 6,219,632 B1 | 4/2001 | Schumacher et al. | |
| 6,236,958 B1 | 5/2001 | Lange et al. | |
| 6,253,169 B1 | 6/2001 | Apte et al. | |
| 6,275,792 B1 | 8/2001 | Lewis | |
| 6,286,064 B1 | 9/2001 | King et al. | |
| 6,307,548 B1 | 10/2001 | Flinchem et al. | |
| 6,307,549 B1 | 10/2001 | King et al. | |
| 6,321,192 B1 | 11/2001 | Houchin et al. | |
| 6,327,561 B1 | 12/2001 | Smith et al. | |
| 6,362,752 B1 | 3/2002 | Guo et al. | |
| 6,377,965 B1 | 4/2002 | Hachamovitch et al. | |
| 6,393,399 B1 | 5/2002 | Even | |
| 6,405,060 B1 | 6/2002 | Schroeder et al. | |
| 6,460,015 B1 | 10/2002 | Hetherington et al. | |
| 6,484,136 B1 | 11/2002 | Kanevsky et al. | |
| 6,490,549 B1 | 12/2002 | Ulicny et al. | |
| 6,519,557 B1 | 2/2003 | Emens et al. | |
| 6,523,134 B2 | 2/2003 | Korenshtein | |
| 6,573,844 B1 | 6/2003 | Venolia et al. | |
| 6,583,798 B1 * | 6/2003 | Hoek ........................ G06F 17/24 715/210 | |
| 6,618,697 B1 * | 9/2003 | Kantrowitz ............ G06F 17/273 703/2 | |
| 6,625,600 B2 | 9/2003 | Lyudovyk et al. | |
| 6,671,670 B2 | 12/2003 | Levin et al. | |
| 6,724,936 B1 | 4/2004 | Riemer | |
| 6,778,958 B1 | 8/2004 | Nishimura et al. | |
| 6,813,616 B2 | 11/2004 | Simpson et al. | |
| 6,901,364 B2 | 5/2005 | Nguyen et al. | |
| 6,911,608 B2 | 6/2005 | Levy | |
| 6,917,910 B2 | 8/2005 | Itoh et al. | |
| 6,925,433 B2 | 8/2005 | Stensmo | |
| 6,963,831 B1 | 11/2005 | Epstein | |
| 6,965,856 B1 | 11/2005 | Stuermer | |
| 6,993,476 B1 | 1/2006 | Dutta et al. | |
| 7,075,520 B2 | 7/2006 | Williams | |
| 7,092,870 B1 | 8/2006 | Chen et al. | |
| 7,098,896 B2 | 8/2006 | Kushler et al. | |
| 7,129,932 B1 | 10/2006 | Klarlund et al. | |
| 7,175,438 B2 | 2/2007 | Levy | |
| 7,187,365 B2 | 3/2007 | Harman | |
| 7,218,249 B2 | 5/2007 | Chadha | |
| 7,222,067 B2 | 5/2007 | Glushnev et al. | |
| 7,251,367 B2 | 7/2007 | Zhai | |
| 7,269,546 B2 | 9/2007 | Stensmo | |
| 7,286,115 B2 * | 10/2007 | Longe ................... G06F 3/0236 345/156 | |
| 7,366,666 B2 | 4/2008 | Balchandran et al. | |
| 7,395,081 B2 | 7/2008 | Bonnelykke et al. | |
| 7,426,505 B2 | 9/2008 | Simpson et al. | |
| 7,453,439 B1 | 11/2008 | Kushler et al. | |
| 7,475,010 B2 | 1/2009 | Chao | |
| 7,487,461 B2 | 2/2009 | Zhai et al. | |
| 7,562,016 B2 | 7/2009 | Balchandran et al. | |
| 7,580,829 B2 | 8/2009 | James et al. | |
| 7,610,189 B2 | 10/2009 | Mackie | |
| 7,610,191 B2 | 10/2009 | Gao et al. | |
| 7,706,616 B2 | 4/2010 | Kristensson et al. | |
| 7,720,682 B2 | 5/2010 | Stephanick et al. | |
| 7,750,891 B2 | 7/2010 | Stephanick et al. | |
| 7,809,575 B2 | 10/2010 | Ativanichayaphong et al. | |
| 7,814,088 B2 | 10/2010 | Simpson et al. | |
| 7,843,427 B2 | 11/2010 | Ording et al. | |
| 7,895,518 B2 * | 2/2011 | Kristensson .......... G06F 3/0237 715/263 | |
| 7,900,142 B2 | 3/2011 | Baer | |
| 7,904,298 B2 | 3/2011 | Rao | |
| 7,912,700 B2 | 3/2011 | Bower et al. | |
| 7,920,132 B2 | 4/2011 | Longe et al. | |
| 7,953,692 B2 | 5/2011 | Bower et al. | |
| 7,996,211 B2 | 8/2011 | Gao et al. | |
| 8,010,343 B2 | 8/2011 | Agapi et al. | |
| 8,032,358 B2 | 10/2011 | Helletzgruber et al. | |
| 8,036,878 B2 | 10/2011 | Assadollahi | |
| 8,073,698 B2 | 12/2011 | Ativanichayaphong et al. | |
| 8,074,172 B2 | 12/2011 | Kocienda et al. | |
| 8,117,144 B2 | 2/2012 | Angell et al. | |
| 8,136,050 B2 | 3/2012 | Sacher et al. | |
| 8,200,487 B2 | 6/2012 | Peters et al. | |
| 8,201,109 B2 * | 6/2012 | Van Os ................. G06F 3/0488 715/710 | |
| 8,225,203 B2 | 7/2012 | Unruh | |
| 8,232,973 B2 | 7/2012 | Kocienda et al. | |
| 8,289,283 B2 | 10/2012 | Kida et al. | |
| 8,299,943 B2 | 10/2012 | Longe | |
| 8,516,367 B2 | 8/2013 | Archer | |
| 8,601,019 B1 * | 12/2013 | Weininger .......... G06F 17/3097 707/769 | |
| 8,605,039 B2 | 12/2013 | Danielsson et al. | |
| 8,713,432 B2 | 4/2014 | Assadollahi | |
| 8,756,527 B2 | 6/2014 | Paasovaara | |
| 8,812,972 B2 | 8/2014 | Bangalore | |
| 9,189,472 B2 | 11/2015 | Medlock et al. | |
| 9,424,246 B2 | 8/2016 | Spencer et al. | |
| 9,529,524 B2 * | 12/2016 | Van Os ................. G06F 3/0488 | |
| 9,659,002 B2 | 5/2017 | Medlock et al. | |
| 2002/0045463 A1 | 4/2002 | Chen et al. | |
| 2002/0077808 A1 | 6/2002 | Liu et al. | |
| 2002/0091520 A1 | 7/2002 | Endo et al. | |
| 2002/0111806 A1 | 8/2002 | Franz et al. | |
| 2002/0126097 A1 | 9/2002 | Savolainen | |
| 2002/0156627 A1 | 10/2002 | Itoh et al. | |
| 2002/0188448 A1 | 12/2002 | Goodman et al. | |
| 2002/0196163 A1 | 12/2002 | Bradford et al. | |
| 2003/0011574 A1 | 1/2003 | Goodman | |
| 2003/0023420 A1 | 1/2003 | Goodman | |
| 2003/0046073 A1 | 3/2003 | Mori et al. | |
| 2003/0073451 A1 | 4/2003 | Kraft | |
| 2003/0093263 A1 | 5/2003 | Chen et al. | |

(56) References Cited

U.S. PATENT DOCUMENTS

| | | |
|---|---|---|
| 2003/0182279 A1 | 9/2003 | Willows |
| 2003/0234821 A1 | 12/2003 | Pugliese |
| 2004/0021691 A1* | 2/2004 | Dostie .................. G06F 3/0237 715/773 |
| 2004/0021700 A1* | 2/2004 | Iwema ............... G06K 9/00436 715/863 |
| 2004/0056844 A1* | 3/2004 | Gutowitz ............. G06F 3/0236 345/168 |
| 2004/0083198 A1 | 4/2004 | Bradford et al. |
| 2004/0136564 A1 | 7/2004 | Roeber et al. |
| 2004/0153975 A1 | 8/2004 | Williams et al. |
| 2004/0156562 A1 | 8/2004 | Mulvey et al. |
| 2004/0201607 A1 | 10/2004 | Mulvey et al. |
| 2004/0243393 A1 | 12/2004 | Wang |
| 2005/0017954 A1 | 1/2005 | Kay et al. |
| 2005/0044495 A1 | 2/2005 | Lee et al. |
| 2005/0060138 A1 | 3/2005 | Wang et al. |
| 2005/0114770 A1 | 5/2005 | Sacher et al. |
| 2005/0162395 A1 | 7/2005 | Unruh |
| 2005/0190970 A1 | 9/2005 | Griffin |
| 2005/0200609 A1 | 9/2005 | Van Der Hoeven |
| 2005/0270270 A1 | 12/2005 | Chadha |
| 2005/0283724 A1 | 12/2005 | Griffin |
| 2006/0036428 A1 | 2/2006 | Ramsey |
| 2006/0047498 A1 | 3/2006 | Fux et al. |
| 2006/0142997 A1 | 6/2006 | Jakobsen et al. |
| 2006/0206313 A1 | 9/2006 | Xu et al. |
| 2006/0217144 A1 | 9/2006 | Bonnelykke Kristensen et al. |
| 2006/0247915 A1 | 11/2006 | Bradford et al. |
| 2006/0253793 A1* | 11/2006 | Zhai .................... G06F 3/04883 715/773 |
| 2006/0265208 A1 | 11/2006 | Assadollahi |
| 2006/0265648 A1 | 11/2006 | Rainisto et al. |
| 2006/0274051 A1 | 12/2006 | Longe et al. |
| 2006/0290535 A1 | 12/2006 | Thiesson et al. |
| 2007/0016572 A1 | 1/2007 | Bates et al. |
| 2007/0033002 A1 | 2/2007 | Dymetman et al. |
| 2007/0046641 A1 | 3/2007 | Lim |
| 2007/0061753 A1 | 3/2007 | Ng et al. |
| 2007/0074131 A1 | 3/2007 | Assadollahi |
| 2007/0076862 A1 | 4/2007 | Chatterjee et al. |
| 2007/0088729 A1 | 4/2007 | Baca et al. |
| 2007/0094024 A1 | 4/2007 | Kristensson et al. |
| 2007/0155369 A1 | 7/2007 | Jobs et al. |
| 2007/0157122 A1 | 7/2007 | Williams |
| 2007/0247436 A1 | 10/2007 | Jacobsen |
| 2008/0040099 A1 | 2/2008 | Wu et al. |
| 2008/0076472 A1 | 3/2008 | Hyatt |
| 2008/0077406 A1 | 3/2008 | Ganong |
| 2008/0091412 A1 | 4/2008 | Strope et al. |
| 2008/0094356 A1 | 4/2008 | Ording et al. |
| 2008/0120102 A1 | 5/2008 | Rao |
| 2008/0126075 A1 | 5/2008 | Thorn |
| 2008/0162113 A1 | 7/2008 | Dargan |
| 2008/0168366 A1 | 7/2008 | Kocienda et al. |
| 2008/0189605 A1 | 8/2008 | Kay et al. |
| 2008/0195374 A1 | 8/2008 | Holubar et al. |
| 2008/0195388 A1 | 8/2008 | Bower et al. |
| 2008/0195571 A1 | 8/2008 | Furuuchi et al. |
| 2008/0281583 A1 | 11/2008 | Slothouber et al. |
| 2008/0282154 A1 | 11/2008 | Nurmi |
| 2008/0285857 A1 | 11/2008 | Sharan et al. |
| 2008/0291059 A1 | 11/2008 | Longe |
| 2008/0294982 A1 | 11/2008 | Leung et al. |
| 2008/0310723 A1 | 12/2008 | Manu et al. |
| 2008/0312910 A1 | 12/2008 | Zhang |
| 2009/0006101 A1 | 1/2009 | Rigazio et al. |
| 2009/0009367 A1 | 1/2009 | Hirshberg |
| 2009/0019002 A1 | 1/2009 | Boulis |
| 2009/0058690 A1 | 3/2009 | Scott |
| 2009/0058813 A1* | 3/2009 | Rubanovich .......... G06F 1/1626 345/169 |
| 2009/0106695 A1 | 4/2009 | Perry et al. |
| 2009/0150322 A1 | 6/2009 | Bower et al. |
| 2009/0174667 A1 | 7/2009 | Kocienda et al. |
| 2009/0187846 A1 | 7/2009 | Paasovaara |
| 2009/0193334 A1 | 7/2009 | Assadollahi |
| 2009/0210214 A1 | 8/2009 | Qian et al. |
| 2009/0225041 A1 | 9/2009 | Kida et al. |
| 2009/0249198 A1 | 10/2009 | Davis et al. |
| 2009/0271195 A1 | 10/2009 | Kitade et al. |
| 2009/0284471 A1 | 11/2009 | Longe et al. |
| 2009/0313572 A1 | 12/2009 | Paek et al. |
| 2010/0017393 A1 | 1/2010 | Broicher et al. |
| 2010/0031143 A1 | 2/2010 | Rao et al. |
| 2010/0106740 A1 | 4/2010 | Kawauchi |
| 2010/0121870 A1 | 5/2010 | Unruh et al. |
| 2010/0153880 A1* | 6/2010 | Dinn .................... G06F 3/0236 715/816 |
| 2010/0153881 A1* | 6/2010 | Dinn ................. G06F 17/30572 715/825 |
| 2010/0161318 A1 | 6/2010 | Lowles et al. |
| 2010/0171700 A1 | 7/2010 | Sharan et al. |
| 2010/0199176 A1 | 8/2010 | Chronqvist |
| 2010/0218141 A1 | 8/2010 | Xu et al. |
| 2010/0225599 A1 | 9/2010 | Danielsson et al. |
| 2010/0283736 A1 | 11/2010 | Akabane et al. |
| 2011/0029862 A1 | 2/2011 | Scott et al. |
| 2011/0047456 A1 | 2/2011 | Sharan et al. |
| 2011/0063231 A1* | 3/2011 | Jakobs ................ G06F 3/04883 345/173 |
| 2011/0074685 A1 | 3/2011 | Causey et al. |
| 2011/0078563 A1 | 3/2011 | Archer |
| 2011/0078613 A1 | 3/2011 | Bangalore |
| 2011/0179032 A1 | 7/2011 | Ceusters et al. |
| 2011/0197128 A1 | 8/2011 | Assadollahi |
| 2011/0202836 A1* | 8/2011 | Badger ................. G06F 3/0237 715/702 |
| 2011/0291940 A1* | 12/2011 | Ghassabian ........... G06F 1/1626 345/169 |
| 2011/0298719 A1* | 12/2011 | Wong ..................... G06F 3/018 345/171 |
| 2012/0010875 A1 | 1/2012 | Helletzgruber et al. |
| 2012/0029910 A1* | 2/2012 | Medlock ............... G06F 3/0237 704/9 |
| 2012/0167009 A1 | 6/2012 | Davidson et al. |
| 2012/0223889 A1 | 9/2012 | Medlock et al. |
| 2012/0296650 A1 | 11/2012 | Bates et al. |
| 2014/0267045 A1 | 9/2014 | Grieves et al. |
| 2014/0297267 A1 | 10/2014 | Spencer et al. |
| 2014/0350920 A1 | 11/2014 | Medlock et al. |
| 2015/0186362 A1 | 7/2015 | Li et al. |
| 2015/0243279 A1 | 8/2015 | Morse et al. |
| 2015/0332672 A1 | 11/2015 | Akbacak et al. |
| 2016/0077734 A1* | 3/2016 | Buxton ............... G06F 3/04842 715/773 |
| 2016/0104482 A1 | 4/2016 | Aleksic et al. |
| 2016/0328377 A1 | 11/2016 | Spencer et al. |
| 2017/0220552 A1 | 8/2017 | Medlock et al. |

FOREIGN PATENT DOCUMENTS

| | | |
|---|---|---|
| CN | 101496036 A | 7/2009 |
| EP | 0872801 A2 | 10/1998 |
| WO | WO 2001/050335 A1 | 7/2001 |
| WO | 2014150104 A1 | 9/2014 |

OTHER PUBLICATIONS

Talbot et al.; "Smoothed Bloom Filter Language Models: Tera-Scale LMs on the Cheap"; Proceedings of the 2007 Joint Conf. on Empirical Methods in Natural Language Processing and Computational Natural Language Learning; 2007; p. 468-476.

Medlock; "Investigating Classification for Natural Language Processing Tasks"; University of Cambridge, Computer Laboratory; Technical Report No. 721; Jun. 2008; 138 pages.

European Patent Application No. 15155451.6; Extended European Search Report; dated May 12, 2015; 3 pages.

"Ai.type keyboard Free + Emoji"; Android Apps on Google Play; https://play.google.com/store/apps/details?id=com.aitype.android; 2015; accessed May 20, 2015; 31 pages.

(56) References Cited

OTHER PUBLICATIONS

"Intent to Grant Issued in European Patent Application No. 10725232.2", dated Nov. 6, 2014, 6 Pages.
"Notice of Allowance Issued in European Patent Application No. 10725232.2", dated Jan. 29, 2015, 2 Pages.
"Office Action Issued in European Patent Application No. 10775846.8", dated Aug. 4, 2017, 6 Pages.
"Final Office Action Issued in U.S. Appl. No. 13/262,190", dated Nov. 4, 2016, 13 Pages.
"Final Office Action Issued in U.S. Appl. No. 13/262,190", dated May 15, 2015, 16 Pages.
"Final Office Action Issued in U.S. Appl. No. 13/262,190", dated Feb. 12, 2016, 13 Pages.
"Non Final Office Action Issued in U.S. Appl. No. 13/262,190", dated Oct. 26, 2015, 12 Pages.
"Non Final Office Action Issued in U.S. Appl. No. 13/262,190", dated Jul. 18, 2016, 12 Pages.
"Non Final Office Action Issued in U.S. Appl. No. 13/262,190", dated Jan. 22, 2015, 22 Pages.
"Notice of Allowance Issued in U.S. Appl. No. 13/262,190", dated Jan. 19, 2017, 15 Pages.
"Final Office Action Issued in U.S. Appl. No. 13/415,574", dated Jan. 28, 2015, 14 Pages.
"Non-Final Office Action Issued in U.S. Appl. No. 13/415,574", dated Oct. 14, 2014, 12 Pages.
"Notice of Allowance Issued in U.S. Appl. No. 13/415,574", dated Aug. 20, 2015, 10 Pages.
"Corrected Notice of Allowance Issued in U.S. Appl. No. 14/307,308", dated Jun. 3, 2016, 2 Pages.
"Final Office Action Issued in U.S. Appl. No. 14/307,308", dated Nov. 23, 2015, 12 Pages.
"Non Final Office Action Issued in U.S. Appl. No. 14/307,308", dated Aug. 17, 2015, 16 Pages.
"Notice of Allowance Issued in U.S. Appl. No. 14/307,308", dated Apr. 25, 2016, 13 Pages.
"Final Office Action Issued in U.S. Appl. No. 14/452,887", dated Feb. 21, 2018, 60 Pages.
"Final Office Action Issued in U.S. Appl. No. 14/452,887", dated Mar. 13, 2015, 45 Pages.
"Final Office Action Issued in U.S. Appl. No. 14/452,887", dated Sep. 8, 2016, 52 Pages.
"Non Final Office Action Issued in U.S. Appl. No. 14/452,887", dated May 6, 2016, 47 Pages.
"Non Final Office Action Issued in U.S. Appl. No. 14/452,887", dated Nov. 5, 2014, 40 Pages.
"Non-Final Office Action Issued in U.S. Appl. No. 14/452,887", dated Oct. 5, 2017, 53 Pages.
"Final Office Action Issued in U.S. Appl. No. 15/213,168", dated Nov. 15, 2017, 21 Pages.
"Non Final Office Action Issued in U.S. Appl. No. 15/213,168", dated Jul. 28, 2017, 16 Pages.
"Non Final Office Action Issued in U.S. Appl. No. 15/213,168", dated May 7, 2018, 22 Pages.
"Final Office Action Issued in U.S Appl. No. 15/493,028", dated Oct. 20, 2017, 11 Pages.
"Notice of Allowance issued in U.S Appl. No. 15/493,028", dated May 9, 2018, 12 Pages.
"First Office Action and Search Report Issued in Chinese Patent Application No. 201080022530.6", dated Dec. 4, 2013, 26 Pages.
"Fourth Office Action Issued in Chinese Patent Application No. 201080022530.6", dated Jul. 13, 2015, 10 Pages.
"Notice of Allowance Issued in Chinese Patent Application No. 201080022530.6", dated Nov. 26, 2015, 3 Pages.
"Second Office Action Issued in Chinese Patent Application No. 201080022530.6", dated Aug. 11, 2014, 25 Pages.
"Third Office Action Issued in Chinese Patent Application No. 201080022530.6", dated Feb. 28, 2015, 27 Pages.
"First Office Action and Search Report Issued in Chinese Patent Application No. 201610080975.9", dated Dec. 14, 2017, 22 Pages.
Bellegarda, Jerome R., "Statistical Language Model Adaptation: Review and Perspectives", In Proceedings the Speech Communication, vol. 42, Issue 1, Jan. 31, 2004, pp. 93-108.
Bosch, et al., "Efficient Context-sensitive Word Completion for Mobile Devices", In Proceedings of the 10th International Conference on Human Computer Interaction with Mobile Devices and Services, Sep. 2, 2008, pp. 465-470.
Duda, "Pattern Classification", 2nd Edition, Chapter 10, by Wiley-Interscience, Sep. 3, 1997, 41 Pages.
Federico, Marcello, "Efficient Language Model Adaptation Through MDI Estimation", In Proceedings of Eurospeech, Sep. 1999, 4 Pages.
Frederico, Marcello, "Bayesian Estimation Methods for N-Gram Language Model Adaptation", In Proceedings of the Fourth International Conference on Spoken Language, Oct. 3, 1996, 4 Pages.
How, et al., "Optimizing Predictive Text Entry for Short Message Service on Mobile Phones", In Proceedings of International Conference on Hybrid Information Technology, vol. 5, Jul. 2005, 10 Pages.
Lesher, et al., "Domain-Specific Word prediction for augmentative communication", In Proceedings of RESNA Annual Conference, Jan. 2002, 3 Pages.
Li, et al., "Using Uneven Margins SVM and Perception for Information Extraction", In Proceedings of the 9th Conference on Computational Natural Language Learning, Jun. 2005, pp. 72-79.
"International Search Report and Written Opinion Issued in PCT Application No. PCT/GB2010/000622", dated May 8, 2010, 13 Pages.
Silfverberg, et al., "Predicting Text Entry Speed on Mobile Phones", In Proceedings of the SIGCHI Conference on Human Factors in Computing Systems, Apr. 1, 2000, pp. 9-16.
Trapani, Gina, "Cupcake Adds Camcorder, Touchscreen Keyboard and More to Android", Retrieved from «https://lifehacker.com/5272021/cupcake-adds-camcorder-touchscreen-keyboard-and-more-to-android», May 28, 2009, 5 Pages.
Trnka, et al., "Topic Modeling in Fringe Word Prediction for AAC", In Proceedings of the 11th International Conference on Intelligent User Interfaces, 2006, 8 Pages.
Van Den Bosch, et al., "Efficient Context-sensitive Word Completion for Mobile Devices", In Proceedings of the 10th International Conference of Human Computer Interaction with Mobile Devices and Services, ACM, 2008, pp. 465-470.
"Final Office Action Issued in U.S. Appl. No. 15/213,166", dated Aug. 29, 2018, 18 Pages.

\* cited by examiner

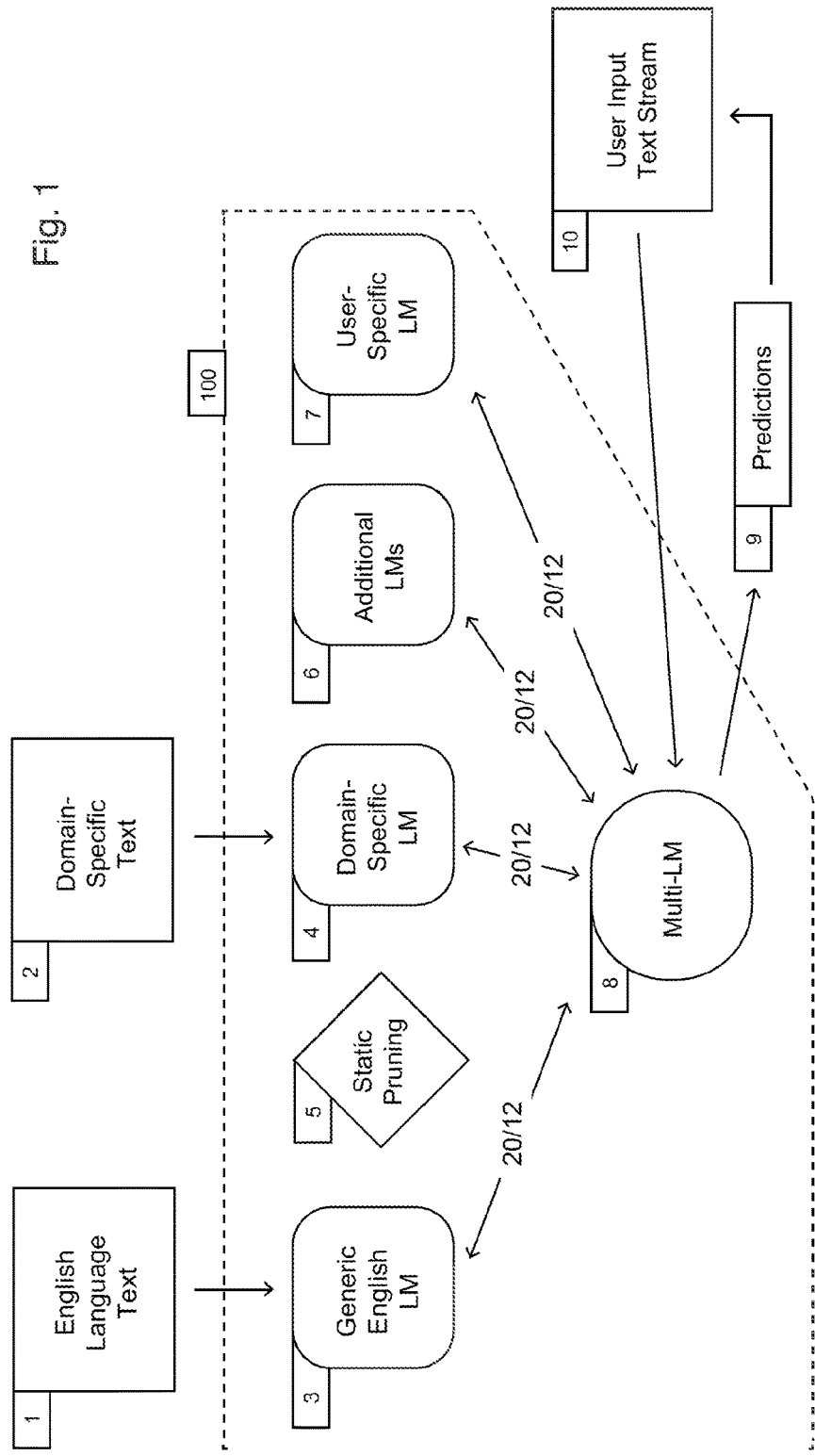

```
Input:
1. [(I → 1.0)]
2. [(l → 0.5), ('l → 0.5)]
3. [(l → 0.2)]
```

```
Output:
[ID:2 (I'll) → 0.1]
[ID:4 (Ill) → 0.1]
```

```
Input:
1. [(I → 1.0)]
2. [(l → 0.5), ('l → 0.5)]
3. [(l → 0.2)]
```

```
Output:
[ID:2 (I'll) → 0.1]
[ID:4 (Ill) → 0.1]
```

23 = Typing Pane
24, 26 = Side Pane
25 = Prediction Pane

27 = Typing Pane
29 = Single Pane
38 = Actual Character Entry Button
48 = Most Likely Word Button
58 = Alternative Word Button

SYSTEM AND METHOD FOR INPUTTING TEXT INTO ELECTRONIC DEVICES

CROSS REFERENCE TO RELATED APPLICATIONS

This application is a continuation-in-part of U.S. patent application Ser. No. 13/262,190, filed Sep. 29, 2011, which is a National Stage of International Application No. PCT/GB2010/000622, filed Mar. 30, 2010, which claims priority to GB Patent Application No. 0905457.8, filed Mar. 30, 2009, the disclosures of each of which are incorporated herein by reference in their entirety.

TECHNICAL FIELD

The present disclosure relates generally to a system and method for inputting text into electronic devices. In particular the disclosure relates to a system for generating text predictions for display and user selection and a method for doing so.

BACKGROUND

There currently exists a wide range of text input techniques for use with electronic devices. QWERTY-style keyboards are the de facto standard for text input on desktop and laptop computers. The QWERTY layout was designed for two-handed, multi-digit typing on typewriters in 1878 and has been in wide use ever since. It has proven highly effective given a measure of training and/or experience. Reduced-size QWERTY-style keyboards are also used for text entry on mobile devices, such as PDAs and some mobile phones. These keyboards are generally operated using both thumbs, and their advantage lies in the fact that users are almost always familiar with the QWERTY layout. Devices such as the BLACKBERRY BOLD and the NOKIA N810 utilize this model.

Text input for mobile phones, however, has focused primarily on methods of entering alphabetic characters using a 9-digit keypad, where each key usually represents either three or four characters. There are various techniques employed to reduce the number of keystrokes required.

Handwriting recognition has been widely used in the PDA market where input is mostly stylus-based. While it has some advantages for users raised on paper-based handwriting, the use of this technology has declined in recent years because it is relatively slow in comparison with most keyboard-based methods. Speech recognition text input systems also exist for both standard and mobile computational devices. These have not been widely adopted due to limitations in accuracy and the adverse effects of noisy environments.

Touch-screen devices offer a highly flexible platform for different styles of text input, and there are many different models currently available. Traditional QWERTY-style 'soft' keyboards are implemented on devices such as the APPLE IPHONE and many touch-screen PDAs running WINDOWS MOBILE. Other devices such as the BLACKBERRY STORM use multi-character soft keyboards with various methods of disambiguation and completion. There are also many third-party systems that offer alternative methods of text entry for touch-screen devices. Examples include SHAPEWRITER (ShapeWriter Inc.) which is based on recognition of the shapes created by sliding between letters on a QWERTY-style background, and EXIDEAS' MESSAGEEASE which utilizes an optimized keyboard layout for stylus and finger-based entry.

A somewhat different model of text entry is offered by the University of Cambridge's 'Dasher' system, in which text input is driven by natural, continuous pointing gestures rather than keystrokes. It relies heavily on advanced language model-based character prediction, and is aimed primarily at improving accessibility for handicapped users, although it can also be used in mobile and speech recognition-based applications.

Many of the input models discussed above utilize some form of text prediction technology. Known prediction models for enhancing text input have two main functions:
 1) Disambiguation of multiple-character keystrokes.
 2) Offering potential completions for partially-entered sequences.

Examples of such technologies include Tegic Communications' 'T9', Motorola's 'ITAP', Nuance's 'XT9', Blackberry's 'SURETYPE' and Zi Technology's 'EZITYPE' and 'EZITEXT'. In each case a dictionary of allowable terms is maintained and, given a particular input sequence, the system chooses a legitimate term (or set of terms) from the dictionary and presents it to the user as a potential completion candidate. T9 requires the user to enter a number of characters equal to the length of the target input sequence, and thus only offers function 1) above, whereas the other systems offer both 1) and 2).

In all of these technologies, the basic dictionary can be augmented with new terms entered by the user. This is limited only by the amount of device memory available. T9 uses a static dictionary, meaning that words sharing the same key sequence are always suggested to the user in the same order. In contrast, Motorola's ITAP utilises a dynamic dictionary, meaning that the first word predicted for a given key sequence may not remain the same each time the key sequence is entered. Rather, completions are suggested in order of most recent use. However, this method does not keep track of which completion is the most probable; it merely chooses the one used most recently.

Blackberry's SURETYPE, Nuance's XT9 and Zi Technology's EZITYPE offer somewhat more sophisticated models, in which candidate completions are ordered on the basis of usage frequency statistics. In addition, Zi Technology's EZITEXT also has the ability to predict multi-word completion candidates given appropriate input, by scanning a user's previous input to identify high frequency phrases.

The present disclosure represents a fundamental shift away from predominantly character-based text input.

SUMMARY

In accordance with the present disclosure there is provided a system comprising: one or more processors; and program instructions for providing a user interface, wherein execution of the program instructions by the one or more processors causes the one or more processors to display a user interface. The user interface comprises: an entry mechanism for entering an input comprising at least one character, symbol, numeral or punctuation mark; a typing pane configured to display the input entered via the entry mechanism; wherein, in response to selection of a prediction based on the input entered via the entry mechanism, the typing pane is configured to replace the input entered via the entry mechanism by the prediction; an undo button, wherein in response to user selection of the undo button, the typing pane is configured to replace the selected prediction by the input entered via the entry mechanism.

In this disclosure the term 'prediction' encompasses correction or completion of the word currently being typed by the user or the prediction of the next word based on context (with or without current word input). A prediction based on user input can be generated using a text prediction engine, a language model, a dictionary or any other suitable means for generating a prediction.

The undo button may correspond to a button which is enabled to perform an undo action, and wherein the user interface enables the undo action in response to the selection of a prediction and, optionally, one or more subsequent selections of a backspace/delete button.

The user interface may be configured to disable the undo action when an additional input has been entered by the entry mechanism.

The entry mechanism may comprise a button which functions as the undo button and a delete/backspace button.

In response to user selection of the undo button, the user interface may be configured to prevent further prediction selection until a predetermined condition is fulfilled. The predetermined condition may comprise performing at least one of the group of actions comprising: the movement of the cursor in the typing pane, the insertion of a space/period, the insertion of a punctuation mark, the selection of an 'enter' or 'return' button, and the selection of a 'correct' button.

The user interface may further comprise a display area configured to display one or more predictions, and wherein, in response to user selection of a prediction from the display area, the typing pane is configured to replace the input by the prediction.

In response to user selection of a prediction and, optionally one or more subsequent selections of a backspace/delete button, the display area may be configured to display the undo button, wherein the undo button displays the input which was replaced by the prediction in the typing pane, wherein in response to a user selection of the undo button, the display area is configured to display the one or more predictions displayed prior to the selection of a prediction.

The undo button may display the input which was replaced by the prediction in the typing pane.

The disclosure also provides a non-transitory computer-readable medium containing program instructions for providing a user interface, wherein execution of the program instructions by one or more processors of a computer system causes the one or more processors to display a user interface. The user interface comprises: an entry mechanism for entering an input comprising at least one character, symbol, numeral or punctuation mark; a typing pane configured to display the input entered via the entry mechanism; wherein, in response to selection of a prediction based on the input entered via the entry mechanism, the typing pane is configured to replace the input entered via the entry mechanism by the prediction; an undo button, wherein in response to user selection of the undo button, the typing pane is configured to replace the selected prediction by the input entered via the entry mechanism.

The user interface may be configured to display the undo button in response to the selection of a prediction and, optionally one or more subsequent selections of a delete/backspace button.

The entry mechanism may be a keypad and the undo button may be a button on the keypad.

The prediction may comprise one of the group comprising: a word, multi words, a phrase, an emoji, and a graphical symbol.

The prediction corresponds to a correction of the user input, wherein the user input corresponds to two or more consecutive words, comprising a first word, a second word and, optionally a third word, wherein the prediction corresponds to a corrected version of the first word and, optionally the second and/or third word, wherein the prediction is selected after the second, and optionally the third words have been entered via the entry mechanism.

Execution of the program instructions by one or more processors of a computer system may cause the one or more processors to provide automatic selection of the prediction.

The prediction may be automatically selected in response to one of the group of user actions comprising: insertion of a space/period, insertion of a punctuation mark, selection of an 'enter' or 'return' button, and selection of a correction button.

In response to every selection of a prediction, the user interface may be configured to set a marker, and wherein the undo button is configured to selectively replace the prediction by the input entered via the entry mechanism at every marker.

The present disclosure also provides a system comprising: one or more processors; and program instructions for providing a user interface, wherein execution of the program instructions by the one or more processors causes the one or more processors to display a user interface. The user interface comprises: an entry mechanism for entering an input comprising at least one character, symbol, numeral or punctuation mark; a typing pane configured to display the input entered via the entry mechanism; wherein, in response to selection of a prediction based on the input entered via the entry mechanism, the typing pane is configured to replace the input entered via the entry mechanism by the prediction; wherein the entry mechanism comprises an undo button, wherein in response to user selection of the undo button, the typing pane is configured to replace the selected prediction by the input entered via the entry mechanism.

The undo button may correspond to a backspace/delete button, wherein the undo functionality is enabled on the backspace/delete button in response to selection of the prediction and, optionally, one or more subsequent selections of the backspace/delete button.

The present disclosure also provides a system comprising: an entry mechanism for entering an input comprising at least one character, symbol, numeral or punctuation mark; one or more processors; and program instructions, wherein execution of the program instructions by the one or more processors causes the one or more processors to display a user interface. The user interface comprises: a typing pane configured to display the input entered via the entry mechanism; wherein, in response to selection of a prediction based on the input entered via the entry mechanism, the typing pane is configured to replace the input entered via the entry mechanism by the prediction; wherein the entry mechanism or the user interface comprises an undo button, wherein in response to user selection of the undo button, the typing pane is configured to replace the prediction by the input entered via the entry mechanism.

The present disclosure also provides a system comprising a user interface configured to receive text input by a user, a text prediction engine comprising a plurality of language models and configured to receive the input text from the user interface and to generate concurrently text predictions using the plurality of language models and wherein the text prediction engine is further configured to provide text predictions to the user interface for display and user selection.

The text predictions are generated concurrently from the plurality of language models in real time. The plurality of language models comprises a model of human language and at least one language model specific to an application. The at least one language model specific to an application comprises one or more of an email, SMS text, newswire, academic, blog, or product review specific language model. In an embodiment, the at least one language model specific to an application comprises an email and an SMS text specific language model and the text predictions are generated using one or both of the email and SMS text specific language models. The plurality of language models may also include at least one additional language model, which may be a user community specific language model for example.

In an embodiment of the disclosure, the system includes a mechanism configured to compare a sequence of terms stored in a language model to a sequence of terms stored in one or more other language models and to remove duplicate or multiple entries by retaining only the most probable of the duplicate or multiple entries.

In another embodiment of the disclosure, the plurality of language models includes a user specific language model based on an n-gram language model that is updated to record the frequency of occurrence of n-gram paths input by a user in an n-gram map. The user specific language model is configured, in response to inputted text which is not represented in the user specific language model, to insert new paths into the n-gram map within the language model.

In an embodiment the text prediction engine comprises a mechanism to combine the predictions generated by each language model. The mechanism is configured to insert the predictions into an ordered associative structure or an STL 'multimap' structure and return the p most probable terms as the predictions for provision to the user interface.

The plurality of language models utilise a beginning-of-sequence marker to determine word or phrase predictions in the absence of any preceding text input and/or after end-of-sentence punctuation and/or after new line entry.

In an embodiment of the system of the disclosure, each of the plurality of language models models language using an approximate trie and an n-gram map, wherein the approximate trie is an extension of a standard trie, with a set of values stored at each node for all subsequently allowable character sequences from that node.

In another embodiment of the system of the disclosure, each of the plurality of language models models language using a probabilistic trie and an n-gram map, wherein the probabilistic trie is an extension of a standard trie, with a set of values stored at each node for all subsequently allowable character sequences from that node.

The language model is configured to conduct a search of the n-gram map to determine word or phrase predictions for a next term on the basis of up to n−1 terms of preceding text input. The language model is configured to conduct a search of the approximate trie or the probabilistic trie to ascertain word predictions based on at least one inputted character.

Additionally, where the language model comprises an approximate trie, the language model may include a candidate filter to narrow the predictions determined by the approximate trie, wherein the candidate filter is configured to discard all candidate strings for which the current input is not a substring.

The language model may also include a mechanism to compute the intersection of the predictions determined by the approximate trie and optionally the candidate filter, or the probabilistic trie, and the n-gram map, by searching for and retaining only identifiers that are present in both prediction sets.

In an embodiment, the language model also includes a Bloom filter, comprising an n+1 gram map, which is configured to search the n+1 gram map to return a new prediction set based on a context of 1) the n−1 terms of preceding text input used to search the n-gram map, 2) the prediction terms in the determined intersection, and 3) an extra term of context, immediately preceding the n−1 terms used to search the n-gram map.

In an embodiment, the language model further includes a topic filter which is configured to predict topic categories represented in a current input text, predict topic categories for the terms in the prediction set and adjust the probability of the predictions in the prediction set based on the category and topic predictions.

The present disclosure also provides a touch-screen interface that includes a single or multi-character entry mechanism, a word prediction pane, and a typing pane to display inputted text. The interface includes a menu button which toggles the screen between prediction, numbers and punctuation, and further punctuation screens. The interface includes a send button to send the inputted text to an email application. The user interface is configured for word or phrase input, dependent on which term is chosen for input in a given sequence of words.

The word prediction pane includes one or more word keys to present predicted words and wherein, in response to a word key press, the user interface is configured to display the word in the typing pane. The interface further comprises a delete button and/or an undo button, wherein in response to a press of the undo button or a left-to-right gesture on the delete button, the interface is configured to undo the previous word selection, by erasing the word from the typing pane and returning to the previous prediction pane.

The word prediction pane includes one or more word keys to present predicted words and wherein, in response to a word key press, the user interface is configured to display the word in the typing pane and pass the current input sequence including that word to the text prediction engine as a context input. In response to a word key press and hold or left-to-right gesture on the word key, the user interface is configured to display the word in the typing pane, pass the current input sequence excluding that word to the text prediction engine as a context input, and pass the characters of that word to the text prediction engine as a current word input. The interface further comprises one or more punctuation keys to present punctuation marks and a return key and wherein, in response to an end-of-sequence punctuation or 'return' key press, the user interface is configured to pass the current sequence to the text prediction engine, wherein the text prediction engine comprises a mechanism configured to tokenise the current sequence and pass the tokenised sequence to the user specific language model, and wherein the user specific language model is configured to assign numerical identifiers to the tokenised sequence and update its n-gram map.

In accordance with the present disclosure, there is also provided a method for processing user text input and generating text predictions for user selection. The method includes the steps of receiving text input into a user interface, generating concurrently, using a text prediction engine comprising a plurality of language models, text predictions from the multiple language models, and providing text predictions to the user interface for user selection.

In an embodiment, each of the plurality of language models includes an n-gram map and an approximate trie or a probabilistic trie and the method includes the step of conducting a search of the n-gram map to determine word or phrase predictions for a next term on the basis of up to n−1 terms of preceding text input.

In an embodiment, each of the plurality of language models comprises an n-gram map and an approximate trie or a probabilistic trie and the method includes the step of conducting a search of the approximate trie or the probabilistic trie to ascertain word predictions based on at least one inputted character. Where each of the plurality of language models comprises an approximate trie, the language models also comprising a candidate filter, the method further comprising narrowing the word predictions determined by the approximate trie by discarding all candidate strings for which the current input is not a substring.

The language model comprises a mechanism to compute the intersection of the predictions determined by the approximate trie and optionally the candidate filter, or the probabilistic trie, and the n-gram map and the method includes the further step of computing the intersection of the predictions. The mechanism searches for and retains only identifiers that are present in both prediction sets.

In an embodiment, the language model comprises a Bloom filter which comprises an n+1 gram map and the method includes the additional step of returning a new prediction set based on a context of 1) the n−1 terms of preceding input text used to search the n-gram map, 2) the prediction terms in the determined intersection, and 3) and extra term of context, immediately preceding the n−1 terms used to search the n-gram map.

In an embodiment, the language model further comprises a topic filter and the method includes the further steps of predicting topic categories represented in a current input text, predicting topic categories for the terms in the prediction set and adjusting the probabilities of the predictions in the prediction set based on the topic category predictions.

In an embodiment, the plurality of language models includes a user specific language model based on an n-gram language model and the method includes the further step of updating the frequency of occurrence of n-gram paths, input by a user, in an n-gram map. In response to the input of text which is not represented in the language model, the method includes the step of inserting new paths in the n-gram language model.

The text prediction engine comprises a mechanism to combine the predictions generated from each language model and the method includes the further step of combining the predictions, which combination includes inserting the predictions into an ordered associative structure or an STL 'multimap' structure, and returning the p most probable terms for provision to the user interface.

There is also provided, in accordance with the disclosure a computer program product including a computer readable medium having stored thereon computer program means for causing a processor to carry out the method of the disclosure.

The predictive text input system and method of the present disclosure has significant advantages over current technologies. While T9, ITAP, SURETYPE, etc., are based on term dictionaries, the present system is based on adaptive probabilistic language model technology, which takes into account multiple contextual terms and combines information from multiple language domains in a mathematically well-founded and computationally efficient manner. The present text input system therefore provides a technical improvement that reduces the user labor aspect of text input.

BRIEF DESCRIPTION OF THE DRAWINGS

The present disclosure will now be described in detail with reference to the accompanying drawings, in which:

FIG. 1 is a schematic of a high level prediction architecture according to the disclosure;

DETAILED DESCRIPTION OF ILLUSTRATIVE EMBODIMENTS

Figure 2A:
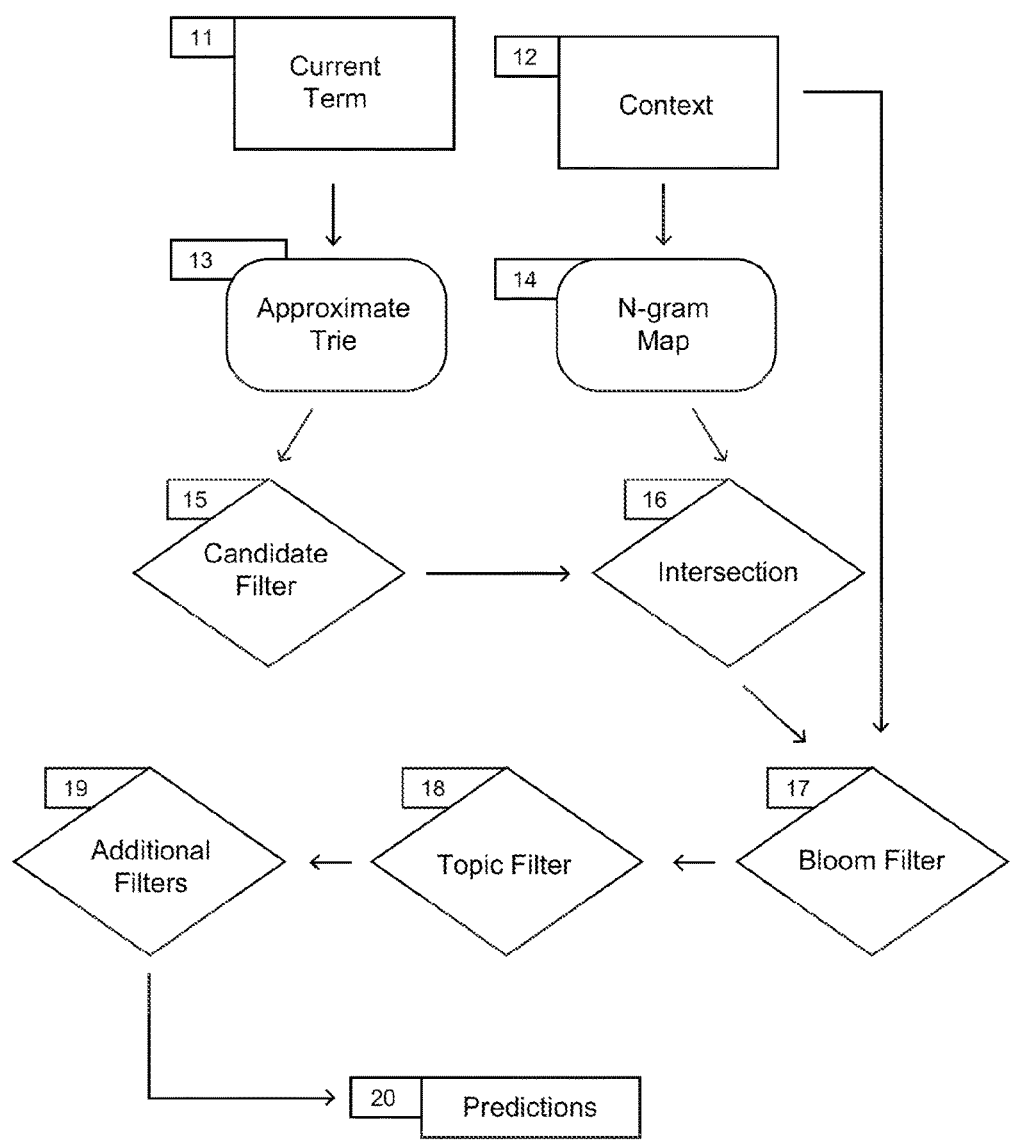
FIGS. 2A, 2B, 2C and 2D are schematics of alternative language models of the prediction architecture according to the disclosure.
Figure 2B:
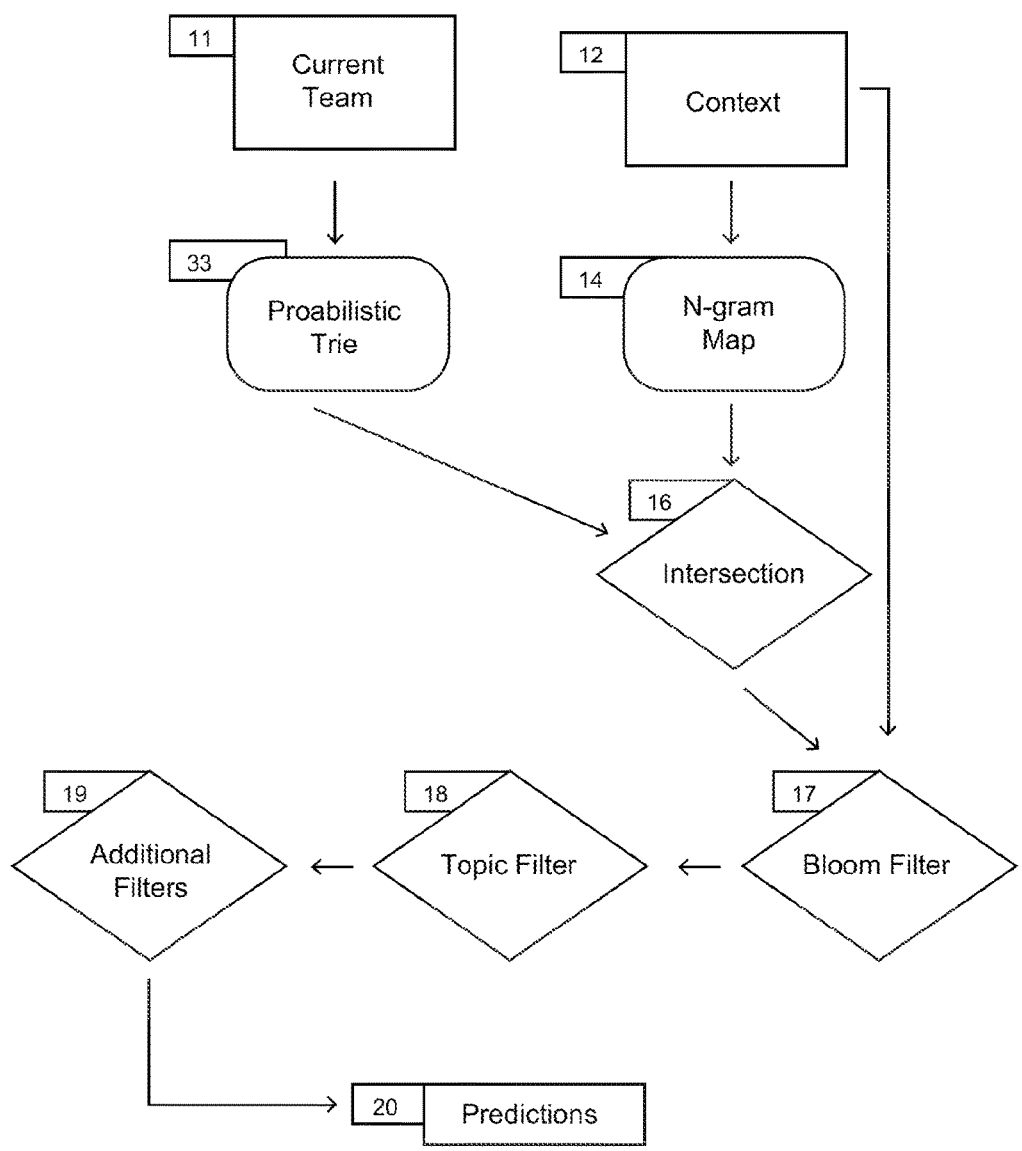

In general, but not exclusive terms, the system of the disclosure can be implemented as shown in FIG. 1. FIG. 1 is a block diagram of a high level text prediction architecture according to the disclosure. The system of the present disclosure comprises a text prediction engine 100 which generates concurrently text predictions 20 from multiple language models. In one embodiment, the system comprises a model 3 of a human language, in this embodiment the English language, and at least one language model 4 specific to an application, although in other embodiments only one of these need be present. In other embodiments, the human language model is of a language other than English. The language models are generated from language texts. Therefore, the model 3 of the English language is generated from English language text 1. The English language text 1 would usually, but need not, constitute a large corpus of English text, sourced from a wide variety of genres and language demographics. Similarly, an application specific language model 4 is generated from text 2 from that specific application.

By way of example only, if the system is a computer or similar device in which the target application is email, then the application specific language model 4 will be a model generated from email language text 2 comprising a large quantity of email messages from a wide variety of authors. Similarly, in the case of a mobile device, the application specific language model 4 will be generated from mobile SMS text language 2. In some embodiments of the system a plurality of application specific language models 4 are required, for example a mobile device can be used for emailing and SMS text messaging, thus requiring an SMS specific language model and an email specific language model. Another example of a system requiring a plurality of application specific language models 4 is that of a computer which can be used for word processing, emailing and sending SMS messages to mobile devices through the internet, thus requiring three application specific language models 4. Other combinations are, of course, possible, and further examples of application specific language models include language models generated from newswires, blogs, academic papers, word processing and patents.

In some embodiments, the system can further comprise additional language models 6. For instance, it might be efficacious to construct a company-specific language model for use within a particular organization. This may include organization specific language enabling prediction of preferred or standard wording, for example, during text input. However, it will be appreciated that the additional language models 6 can comprise any 'user community' specific language model. For example the 'user community' specific language model could comprise a local dialect or interest grouping specific language model.

The language models discussed so far are static language models. That is, they are generated from a representative body of text and thereafter are not changed. Of course, new language models can be created and used, but the existing ones in the system of the disclosure remain unchanged until replaced or removed.

The present system utilizes a mechanism 5, static pruning, across all static language models, to reduce the amount of information stored in the system. If duplicate or multiple (in the case of a system comprising three or more language models) entries are detected, the mechanism 5 'prunes' the language models by retaining only the most probable entry. Static pruning is described with reference to a single language model in a later section of the description.

The text prediction engine 100 operates to generate concurrently text predictions 20 from the multiple language models present. It does this by employing a multi-language model 8 (Multi-LM) to combine the predictions 20 sourced from each of the multiple language models to generate final predictions 9 that are provided to a user interface for display and user selection. The final predictions 9 are a set (i.e. a specified number) of the overall most probable predictions. The Multi-LM 8 generates the final predictions 9 by inserting the predictions 20 from each language model into an ordered associative structure which may be an ordered STL 'multimap' structure.

An ordered associative structure is an abstract data type composed of a collection of unique keys and a collection of values, where each key is associated with one value (or set of values). The structure can be used to store a sequence of elements as an ordered tree of nodes, each storing one element. An element consists of a key, for ordering the sequence, and a mapped value. In one ordered associative structure of the present system, a prediction is a string value mapped to a probability value, and the map is ordered on the basis of the probabilities, i.e. the prediction strings are used as keys in the structure and the probability values are used as values in the structure. In the present system, the structure is ordered by the values (rather than by the keys which are the prediction strings). The operation of finding the value associated with a key is called a lookup or indexing.

An STL multimap is a specific type of ordered associative structure in which duplicate keys are allowed. In the STL multimap of the present system, a prediction is a string value mapped to a probability value, and the map is ordered on the basis of the probabilities, i.e. the probability values are used as keys in the multimap and the strings as values. Since, the keys are used to order the structure, the multimap is naturally ordered by the probability values.

By way of example, given the predictions "a"→0.2 and "the"→0.3 from a first language model, and the predictions "an"→0.1 and "these"→0.2 from a second language model, the Multi-LM 8 inserts these predictions into an ordered associative structure or a multimap such that the entries are ordered by their probabilities ((0.1→"an"), (0.2→"a"), (0.2→"these"), (0.3→"the")). This structure/multimap can subsequently be read from the upper value end to obtain a set of final 'most probable' predictions 9.

In the preferred embodiment, the system further comprises a user specific language model 7, which comprises a dynamic language model trained progressively on user input. The user input text stream 10 refers to the evolving text data generated by the user which is then fed back into the dynamic user specific language model as progressive training data. In response to the input of end-of-sentence punctuation or a 'return' character, or at an otherwise predetermined time, the user inputted text sequence is passed to the Multi-LM 8 which splits the text sequence into 'tokens' as described later. The tokenised sequence data 12 is then passed to the user specific language model 7. The updating of a dynamic language model is described in a later section of the description, with reference to the structure of a single language model.

By updating the user specific language model 7, the language model evolves with user input 10, thereby providing a feedback loop in which predictions generated by the user specific language model 7 depend on the selection by the user of previous predictions 9 generated by the text prediction engine or the addition of words initially absent from the system (which are input by character entry).

Thus the present system utilizes two types of language models, static and dynamic. The user specific language model 7 is an example of a dynamic language model.

The system of the present disclosure is built around the principle of predictive language model inference, in which the probability of a particular term is estimated given a particular context, P(term|context), for all terms in the language. The probabilities are estimated from data observed in training and through dynamic usage of the system. Here, "context" denotes both the terms that have occurred previously in the sequence, as well as any knowledge the system has about the current term (e.g. it starts with a specific character or characters, or it is indicative of a certain topic). Given a particular context, the system predicts the words that are most likely to follow by using estimates of probabilities, P(term|context).

The text prediction engine has the capability of performing phrase-level prediction. For instance, if it is to predict the next two terms, it requires an estimate for P(term1, term2|context) which can be rearranged as P(term1|term2, context)*P(term2|context). P(term1|term2, context) is just P(term1|context2), which is a probability in the format P(term|context), for which it has estimates. P(term2|context) is also in the format P(term|context), for which it has estimates. Therefore, the text prediction engine has the necessary information to perform phrase-level prediction.

Phrase-level prediction significantly increases the upper-bound computational cost, as the predictive text engine must now search in the space of combinations of terms (O(nm) where m is the length of the phrase), but the present system utilizes effective methods of rendering the computational cost manageable.

The system limits the space of combinations of terms (i.e. the space of potential phrase predictions) to a tiny fraction of the full nm, thus reducing the computational costs. To do this, given a predicted term $t_i$, the ith term in a predicted phrase, a following term $t_{i+1}$ is only predicted if the joint probability $P(t_0, t_1 \ldots, t_i)$ exceeds the value of the lowest probability in the current prediction set. The joint probability estimate is obtained by multiplying together each of the individual component probabilities, thereby requiring that a high degree of certainty be attained before a phrase prediction is made. Further phrase-level predictions will not be made if the joint probability falls below a threshold value.

The generation of predictions from an individual language model is now described with reference to FIGS. 2A, 2B, 2C and 2D, which are block diagrams of alternative language models of the prediction architecture according to the disclosure.

There are two inputs into a given language model, a current term input 11 and a context input 12. The current term input 11 comprises information the system has about the term the system is trying to predict, i.e. the term the user is attempting to enter. This could be a sequence of multi-character keystrokes, individual character keystrokes or a mixture of both. For example, if the user was attempting to enter the term "overt", and had input two keystrokes on a multi-character keyboard, the current term input 11 might be the set {o/p, v/x/z}, indicating that the 2-character-key o/p and the 3-character-key v/x/z had been used.

Figure 2C:
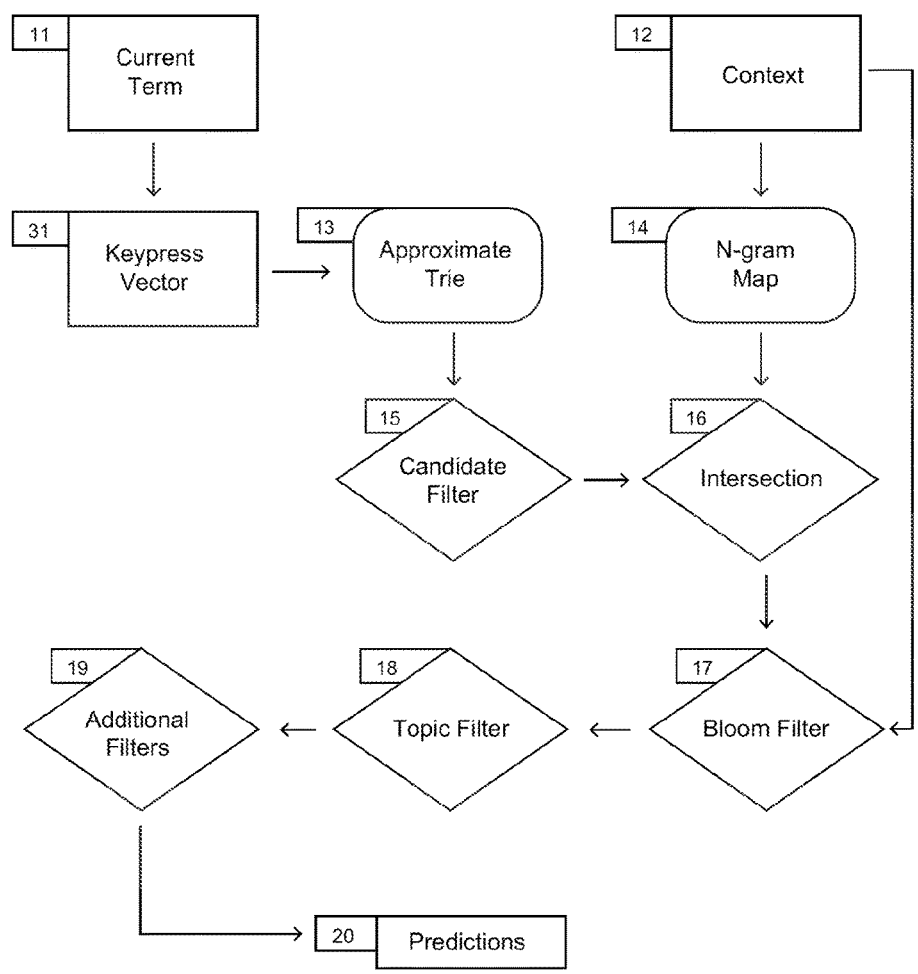
Figure 2D:
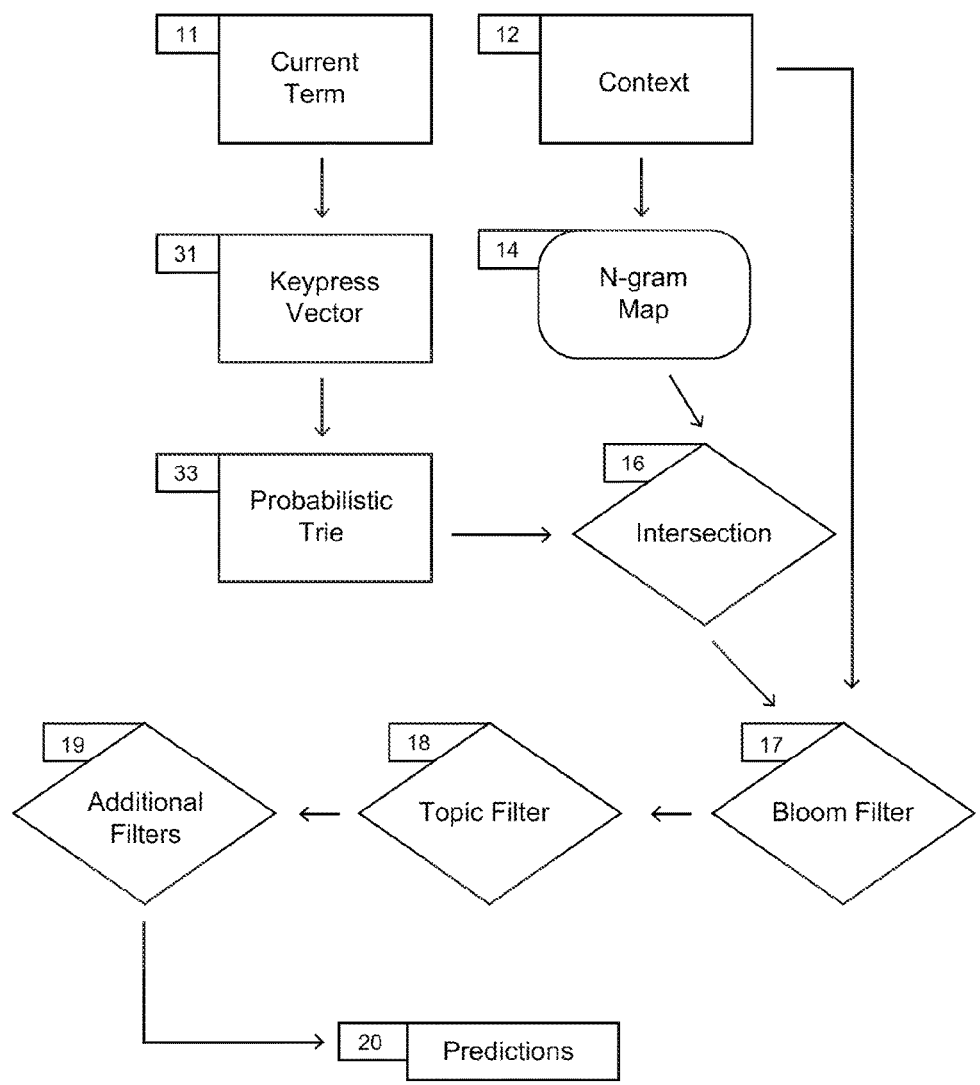

As shown in FIGS. 2C and 2D, the system can be configured to generate a KeyPressVector 31 from the current term input 11. The KeyPressVector takes the form of an indexed series of probability distributions over character sequences. For example, if the user has entered the characters 'i' and 'm', using individual character keystrokes, the KeyPressVector can codify possible alternatives the user might have been intending, e.g.: im, Im or I'm.

The KeyPressVector 31 contains a number of elements equal to the number of keystrokes made by the user, in this example two. An example of a KeyPressVector generated to allow the alternatives shown above might be {[(i->0.7), (I->0.3)], [(m->0.7), ('m->0.3)]}. There are two elements to the KeyPressVector, [(i->0.7), (I->0.3)] and [(m->0.7), ('m->0.3)].

The first element states that the user intended to enter the character 'i' with 0.7 probability, and the character 'I' with 0.3 probability. The second element states that the user intended to enter the character 'm' with 0.7 probability and the character sequence "'m" with 0.3 probability.

As the skilled reader will be aware, the KeyPressVector embodiment is not restricted to individual character keystrokes, and could be used for multi-character keystrokes as well. In the case of multi-character keystrokes, the first element of the KeyPressVector 31 will comprise probability values relating to the multiple characters associated with that keystroke. If the user were to press a key representing the characters g, h and i, the first element of the KeyPressVector will comprise probabilities values associated with g, h and i, and the first element of the KeyPressVector will be [(g->0.33)], [(h->0.33)], [(i->0.33)], as each of the characters sharing the keystroke will have an equal probability.

The probability distributions associated with each keystroke can be generated in a multiplicity of ways. As a non-limiting example, given a standard QWERTY keyboard layout, it can be assumed that if the user enters a particular character, there is some probability that he/she actually meant to press the characters immediately adjacent. By way of a non-limiting example, if the user enters the character 'k', the KeyPressVector might assign a small probability to the characters T, 'i', 'l' and 'm' as they are immediately adjacent to 'k' on the QWERTY keyboard.

Alternatively, probability values might be assigned to characters on the basis of their distance from the point of contact on a touchscreen device. For instance, let's assume that the user touched on the 'h' character key, with the following distances from surrounding key centroids:
1) h: 0.05
2) j: 0.3
3) g: 0.25
4) y: 0.5
5) n: 0.45
6) b: 0.7
7) u: 0.7

The normalized inverse of these distances (i.e. $p=(1/d)/D$, where p is the resultant probability, d is the distance for a particular character, and $D=\Sigma 1/d$, the sum over all inverse distance values) can be used to generate probabilities for the KeyPressVector, e.g.
1) h=20/34.41=0.58
2) j=3.33/34.41=0.1
3) g=4/34.41=0.12
4) y=2/34.41=0.06
5) n=2.22/34.41=0.65
6) b=1.43/34.41=0.04
7) u=1.43/34.41=0.04

More intricate and accurate methods of generating probabilities in the KeyPressVector have the advantage of improving the accuracy of the predictions, but disadvantageously they are usually more costly to compute. Probabilities for character sequences such as 't (which can be used to automatically add an apostrophe before the character 't') must be established a-priori.

Figure 3:
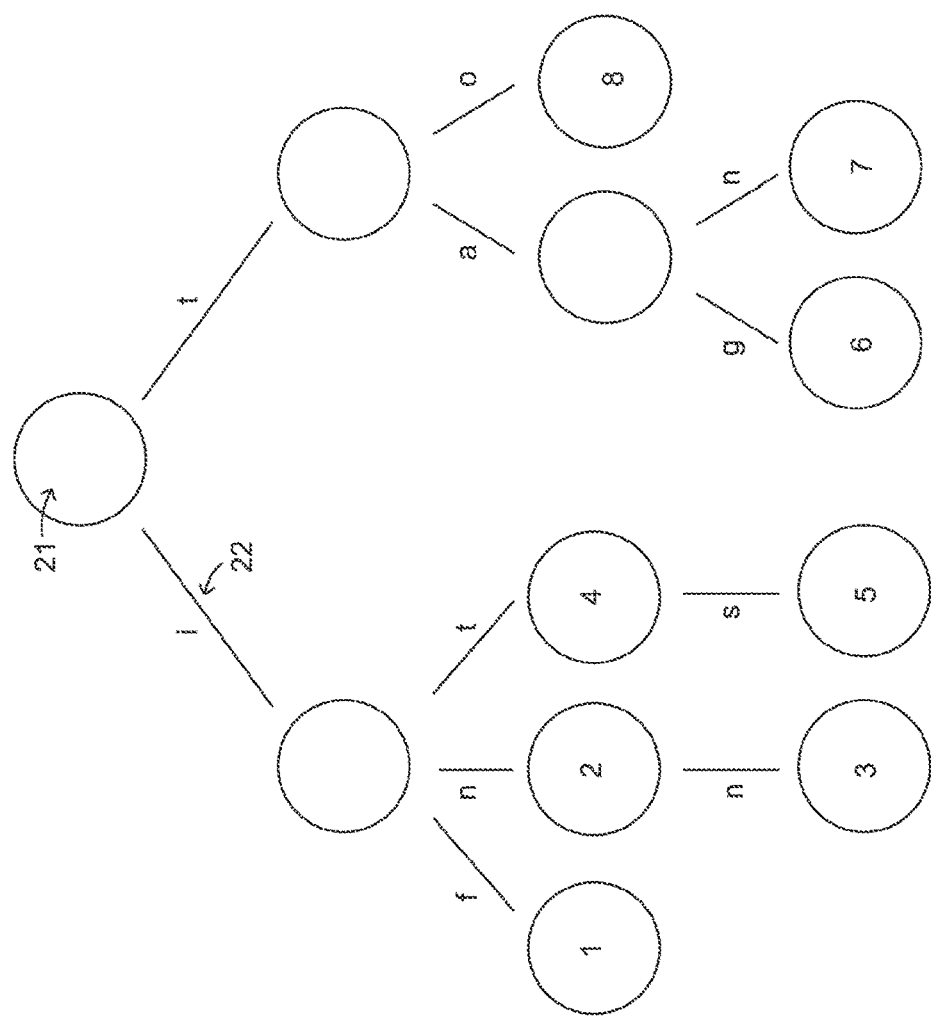
FIG. 3 is a schematic of a standard trie.

Each language model utilizes an approximate trie 13 (see FIGS. 2A and 2C) or a probabilistic trie 33 (see FIGS. 2B and 2D) to generate word predictions based on the current term input 11 or the KeyPressVector 31. An approximate trie 13 or a probabilistic trie 33 is an extended version of a standard trie. A standard trie, or prefix tree, as is known in the art, is an ordered tree-like data structure used to store an associative array of character sequences. An example of a standard trie, used to store a small set of text strings, is illustrated in FIG. 3. Each node 21 contains a pointer 22 to subsequent nodes. Terminal nodes (i.e. nodes which end a word) also contain a value associated with the current path. In a trie, as depicted, characters associated with a given node are ordered alphabetically and the nodes are assigned values according to the alphabetical ordering of the paths. The number of paths from each node is upper bounded by the number of characters in the alphabet. Standard tries facilitate rapid retrieval with efficient storage overheads.

Figure 4A:
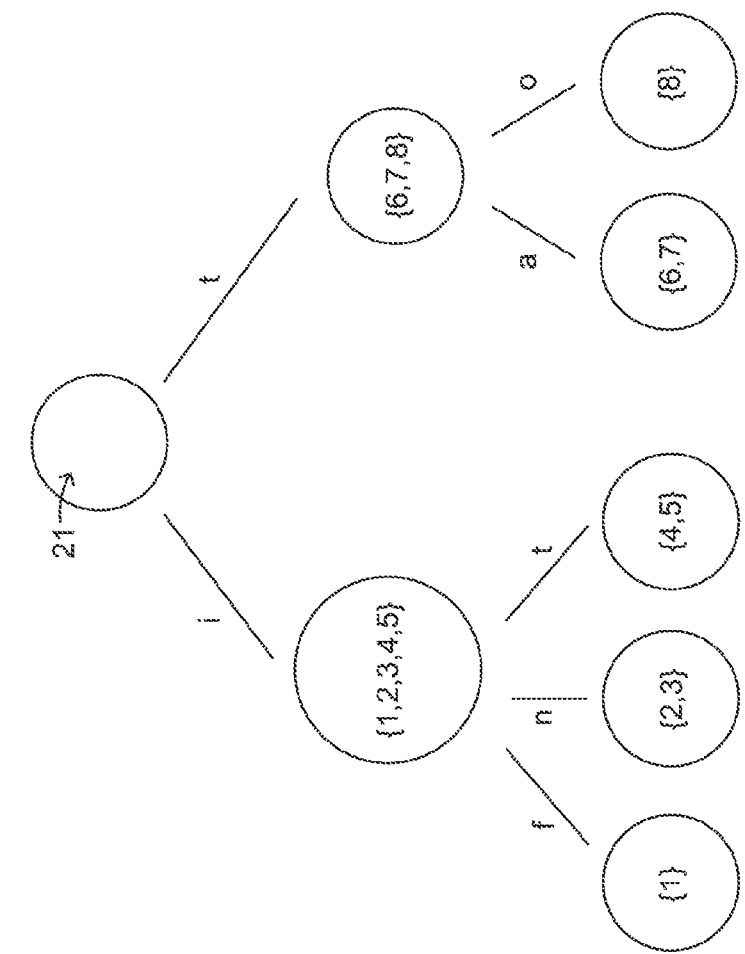
FIG. 4A is a schematic of a compressed approximate trie.

FIG. 4A illustrates an approximate trie 13 according to the disclosure and used to store the same set of text strings as the standard trie of FIG. 3. Instead of storing a single value at each node 21 associated with a path, an approximate trie 13 stores a set of values for all subsequently-allowable sequences. This extension from a standard trie optimizes computational efficiency and memory overheads. It enables the text prediction engine to rapidly identify all sequences that could follow from a given prefix. It also allows the text prediction engine to specify a maximum depth for the internal tree and still guarantee that for any given sequence, if a specified character sequence and associated value was added to the trie then the set of returned values when searching for the given sequence will necessarily contain the respective value.

By way of example, the term "investigate", mapped to numerical identifier '9', can be added to an approximate trie of depth 4 in a language model. The language model will initially follow, in the approximate trie, the path to the node represented by the character 'i' and add the identifier '9' to the set of values at that node (because each node stores a set of values for all subsequently-allowable sequences). It will then follow the path to the node represented by 'n' and add '9' to its values, and the same for 'v', and 'e', at which point the maximum depth has been attained and so the procedure terminates. Subsequently, if "investigate" is being searched for by a language model, the language model will conduct a binary search of the approximate trie to follow the path 'i'→'n'→'v'→'e' and then return the set of values at the node representing 'e', which will necessarily contain the value '9'. However, the set of values at the node representing 'e' will also contain values for any other strings that have also been inserted and begin with "inve".

Hence, the language model cannot guarantee that additional sequence values that are not compatible with a specified search sequence will not be returned, when the current term input exceeds the maximum depth of the approximate trie. Hence, the extension from a standard trie is named as an 'approximate trie', because interrogation returns an approximation to the true set of associated values.

Figure 4B:
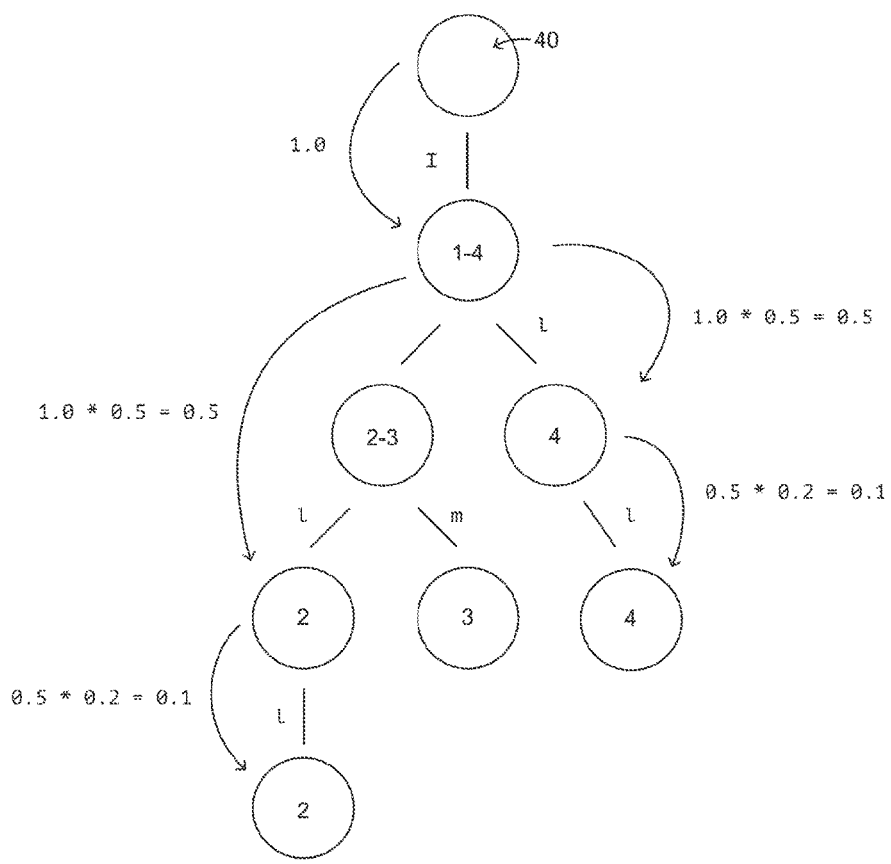
FIG. 4B is a schematic of a probabilistic trie.

An alternative to the approximate trie is shown in FIG. 4B which schematically shows a probabilistic trie 33. In the illustrated example, the probabilistic trie 33 is used to store the following complete term sequences: "I", "Ill", "I'll", "I'm", as well as substrings such as "Il", "I'l" etc. The arrows illustrate how the probabilistic trie is interrogated, given a particular KeyPressVector 31. In FIG. 4A, the KeyPressVector has three elements, corresponding to three keystrokes:

1) [(I->1.0)]
2) [(1 ->0.5), (1 ->0.5)]
3) [(1 ->0.2)]

Note that for simplicity in this example, the third element of the KeyPressVector consists of a single element with probability 0.2. In practice, each element would consist of a true probability distribution, i.e. summing to 1. Furthermore, for simplicity, this example describes an individual character entry keystroke.

Each arrow in FIG. 4B represents recognition of a sequence within the KeyPressVector (which relates to a character that has been entered by a keystroke), and the interrogation procedure attempts to follow every possible path through the KeyPressVector as it descends through the probabilistic trie. If a match is found, the associated probability value for the sequence is multiplied with the current cumulative probability state, and the process continues. The output from interrogation of the probabilistic trie is a sequence of term identifiers mapped to probability values, each term identifier representing a term for which a single path through the KeyPressVector is a (potentially improper) substring.

In this example, if the probabilistic trie is being interrogated with the KeyPressVector, the system would begin at the root node 40, and attempt to follow the sequence contained in the first item in the first element of the Key-PressVector, which in this case is the character "I". The only path leaving the root node contains the character "I" so the system follows it and updates the probability state to 1.0. Since there are no further items in the first element of the KeyPressVector the system moves to the next element, first attempting to follow the character '1' and then the sequence "'1". Both options match the structure of the trie, so both paths are followed and the probability state splits into two, with the relevant multiplication performed in each. In both cases the current state is multiplied by 0.5 to yield 0.5. Note that the system has traversed two states within the trie to follow the "'1" path, but this is considered a single probabilistic transaction, as specified by the KeyPressVector because the user did not enter the apostrophe. The system then moves onto the final element in the KeyPressVector and attempts to match the character '1' from both current states. This is a success, and the relevant probabilistic multiplications are made in both cases, yielding current states of 0.1. As there are no further elements in the KeyPressVector, the system returns the values in the nodes at each end point, along with their respective probability state values, in this case the identifiers 2 and 4, both mapped to the probability value 0.1.

Figure 4C:
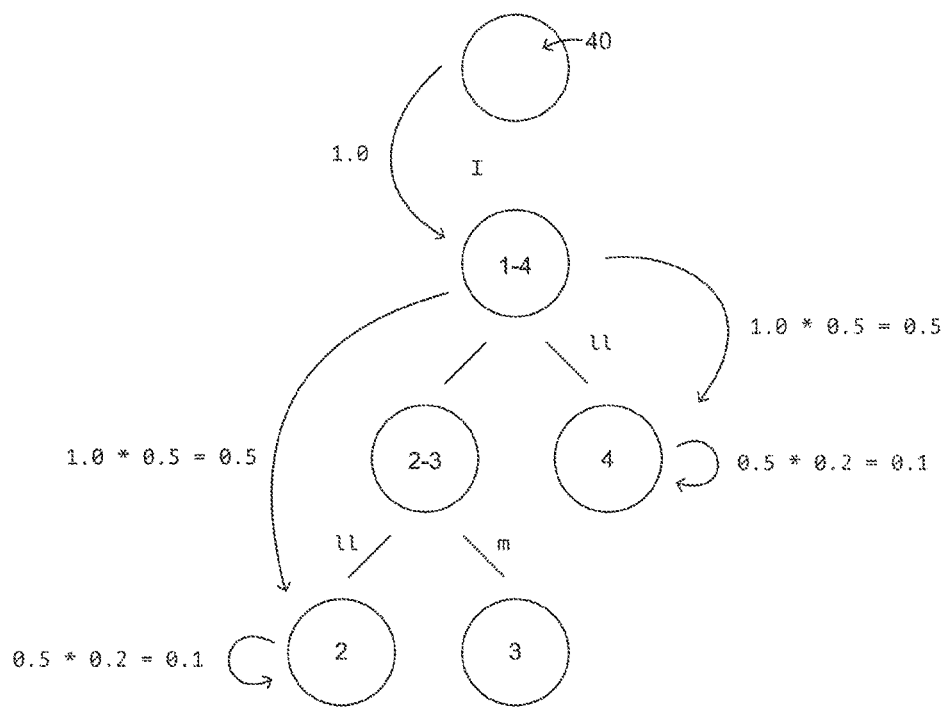
FIG. 4C is a schematic of a compressed probabilistic trie.

To increase memory efficiency the system compresses the full probabilistic trie in a manner known in the art, in a similar way to the compressed approximate trie of FIG. 4A. The probabilistic trie 33 is compressed by concatenating adjacent non-branching nodes. FIG. 4C shows the result of the compression process on the probabilistic trie of FIG. 4B. Paths within the probabilistic trie may now contain multiple characters and some of the arrows begin and end at the same node.

The system of the present disclosure uses a probabilistic trie 33 rather than an approximate trie 13. The probabilistic trie has the advantage of mapping probability values to character strings. Furthermore, the probabilistic trie 33 is not restricted to a specified maximum depth. However, the choice of trie will be dependent on such factors as the available memory.

As the skilled reader will be aware, the KeyPressVector 31 and probabilistic trie 33 of the present disclosure can be used to correct for mistakes in the character entry of a word, in addition to the omission of punctuation marks. Analogous to the example of the insertion of an apostrophe which was omitted by the user, the present system can be configured to insert a repeated character which was omitted by the user. For example, if the user were trying to type 'accommodation', but typed the characters 'a-c-o', the system can account for the missing 'c' by inserting a 'c'. For this example, the KeyPressVector 31 for the character sequence could be [("a"->1), ("c"->0.9, "cc"->0.1), ("o"->1)]. This KeyPressVector 31 encodes the specific case where a single consonant input is associated with its double counterpart, e.g. c->cc, d->dd, m->mm, etc.

The KeyPressVector 31 can be generalized to account for a missing character entry after each and every character inputted into a system. For example, the KeyPressVector could be generalized to be [("a"->0.9, "a*"->0.1), ("c"->0.9, "c*"->0.1), ("o"->0.9, "o*"->0.1)]. In this example of a KeyPressVector 31, every single character input is associated with a potential double character input, but the identity of the second character is left unspecified. The omitted character symbol "*" is implemented in the probabilistic trie by following all possible paths from the current node, with the specified probability. So, in the example above, given the first element: ("a"->0.9, "a*"->0.1) the path corresponding to the character "a" will be followed with probability 0.9. and all existing paths corresponding to "a" followed by another character will also be followed, but with probability 0.1. Examples of such paths could include "ab", "ac", "ad", "a-" etc.

A similar concept can be implemented to insert a null character, i.e. to ignore a character entered by a user. For example if the user inserted the characters 'n-e-c-c' when trying to type 'necessary', the system can be configured to ignore a repeated consonant, i.e. to search for the sequence 'n-e-c' only. An example KeyPressVector 31 for the character entry 'n-e-c-c' could therefore be [("n"->1), ("e"->1), ("c"->1), ("c"->0.9, " "->0.1)], where " "->0.1 corresponds to matching an "empty" string with an (example) probability of 0.1. The KeyPressVector can be generalized to 'ignore' each character entered by the user, by inserting a null character with a certain probability after each character entered. Such a generalized KeyPressVector 31 may be [("n"->0.9, " "->0.1), ("e"->0.9, " "->0.1), ("c"->0.9, " "->0.1), ("c"->0.9, " "->0.1)]. The null character, " ", is implemented in the probabilistic trie by the KeyPressVector remaining at the current node. These concepts can be extended to associate a small probability that the user has omitted a character or inserted the wrong character after the entry of each and every character in a sequence entered by a user.

Obviously, such an implementation will increase the computational costs associated with the system (the "*" operator has a dramatic effect on the number of paths followed), however, it will allow the system to be more tolerant to the incorrect spelling or typing of a user.

Reverting to FIG. 2A or 2C, a candidate filter 15 can be applied by the language model to narrow the set of predictions returned from the approximate trie 13 so that it contains only identifiers for candidates that are truly allowed by the current word input. Candidate filtering is only necessary when the length of the current input exceeds the maximum depth of the approximate trie, which, to be of any use, must be at least 1, and values of around 3-5 are usually appropriate. Even then, however, it need not be used. The depth of the approximate trie is specified a-priori for each language model. The candidate filter looks up the actual candidate term string values represented by the numerical identifiers in the set of numerical identifiers returned by the approximate trie and processes them one-by-one, comparing each with the current input. For a given candidate string s, if the current input is not a substring of s then it is discarded as not a true candidate.

As the reader will understand, a candidate filter is not required to narrow the predictions returned by a probabilistic trie 33 (see FIGS. 2B and 2D), because a probabilistic trie 33 is not restricted to a specified maximum depth.

The context input 12 comprises the sequence entered so far by the user, directly preceding the current word. This sequence is split into 'tokens' by the Multi-LM 8, where a token is an individual term, punctuation entity, number etc. The Multi-LM 8 feeds the tokenised sequence data 12 into each language model as a context input. If the system is generating a prediction for the nth term, the context input 12 will contain the preceding n−1 terms that have been selected and input into the system by the user.

Figure 5:
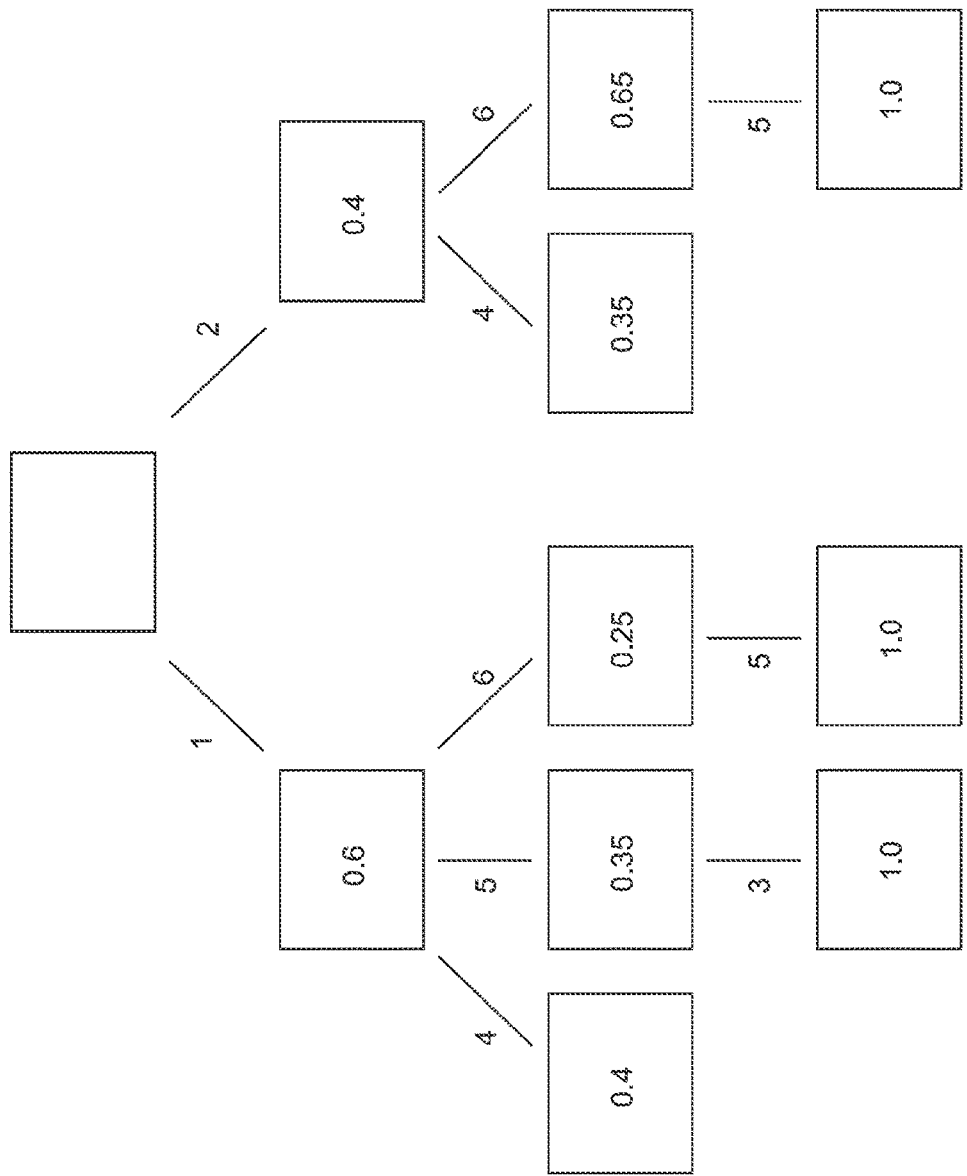
FIG. 5 is a schematic of an n-gram map.

The language model utilizes an n-gram map 14 to generate word and/or phrase predictions based on the context input 12. An n-gram map is an associative map structure, as schematically shown in FIG. 5. In the n-gram map 14, terms in the vocabulary are associated with numerical identifiers (short integers) which are stored in the map and associated with probability values. The combined probabilities of child nodes for a single parent always sum to 1. Identifiers are assigned to terms such that the resulting ordering is from most-to-least frequent, as estimated from the training data used to train each language model. Therefore, the identifiers define an ordering by P(term), which is the unigram probability of terms in the language. This is important because it optimizes the efficiency at which the text prediction engine can conduct n-gram retrieval, by making the approximation P(term|context)~P(term). This approximation is made by ordering the terms at a given n-gram map level by P(term) rather than their true probabilistic ordering which would be P(term|context).

In the present system, n-gram probabilities are stored in a compressed manner to facilitate wide coverage and rapid access on memory-limited devices. The probability values are compressed according to the (lossy) discretization procedure, in which the values are discretized and spread over the range of values available in a single byte of memory. Given a true probability value p, the following formula is used to map it into a single byte of memory: b=int(abs(log (p))*10), where int(x) yields the rounded integer part of real-valued x, and abs(x) yields the absolute value of x.

The n-gram maps can be further compressed by representing string values as short-integer-valued numerical identifiers and by storing higher-order entries "on top of" lower-order entries. So, for example the trigram "in the morning" is stored in the same location as the bigram "in the", but with a link to the additional n-gram head term "morning", i.e. by storing a set of numerical values (identifiers) for all subsequently-allowable sequences at each node in the n-gram map.

To generate predictions from an n-gram map 14, at each map node 21 the language model conducts a binary search to locate specified subsequent child nodes. For example, if the context comprises term1 and term2, the language model will first locate the node for term1. Term2 is then the specified child node that will be searched for. To facilitate this search, child nodes are ordered numerically by their identifiers at each parent node. The node that is being searched for may contain a large number of children, but it is only the high probability candidates that are of interest. Because the nodes are automatically ordered by P(term), the language model can be configured to return only the first k children, where k is a preset value. This method assumes that the highest probability candidates under P(term|context) will reside in the set of the k highest probability candidates under P(term), as long as k is large enough. It is not feasible to order child nodes by P(term|context) as this would require a different map ordering for every node and vastly increase memory overheads.

The generation of predictions from an n-gram map 14 is described further in the following illustrative example. If the language model is searching for the highest probability term candidates, given the two context terms "in" and "the", the language model will search for the terms t that maximize the trigram (3-gram) probability P(t|in the). The language model first looks up the identifier for "in" and then conducts a binary search in the first level of the map to locate the identifier (if it exists). Following from the "in" node, the language model looks up the identifier for "the" and conducts a search to locate it in the next map level. It is likely that this node has many children because "in the" is a common prefix, so the language model is configured to return the identifiers for the first k children (inversely ordered by P(term)), which might correspond to terms such as "morning", "first", "future", "next", "same" etc.

The n-gram map structure described thus far is used in static language models. Static language models are immutable once they have been constructed and directly store compressed n-gram probabilities; they are generated from pre-existing data and are then compiled into binary format files which can be read at run-time.

Conversely, dynamic language models, such as the user specific language model 7, can be updated at any point, and predictions from this type of model are constantly changing as new data is processed.

A dynamic language model is updated in one of two ways: to include a term which is not previously present in a dynamic language model vocabulary; and to update the frequency of an existing term in a particular n-gram context. The dynamic n-gram map stores the frequency at which n-gram paths are input by a user, wherein an 'n-gram path' refers to a particular term and up to n−1 terms of preceding context.

For a current term t, current context c, and dynamic language model D, if t does not exist in the vocabulary of D, then the dynamic language model D maps the term t to a new identifier and inserts it into the approximate trie or the probabilistic trie. To enter a term which does not exist in the vocabulary of the language model D, a user can insert the term by inputting it character-by-character into the user interface of the system. The dynamic language model D then follows the path represented by term t and its context c in the n-gram map and new nodes are created if they do not already exist, thereby creating new n-gram paths in the language model dependent on the preceding context c of the current term t. Paths are added to the dynamic n-gram map for varying context lengths, from no context to n−1 terms of context, where n is the maximum n-gram order for the language model. When a user enters the term t at a later time, the language model D increments a count value stored at the node, of the n-gram map, representing the term t by one, and increments the total value of its parent node by one also. In this way, the frequency of input of the n-gram paths comprising a term t and its varying context, from no context to n−1 terms of context, are updated in the n-gram map.

Figure 6:
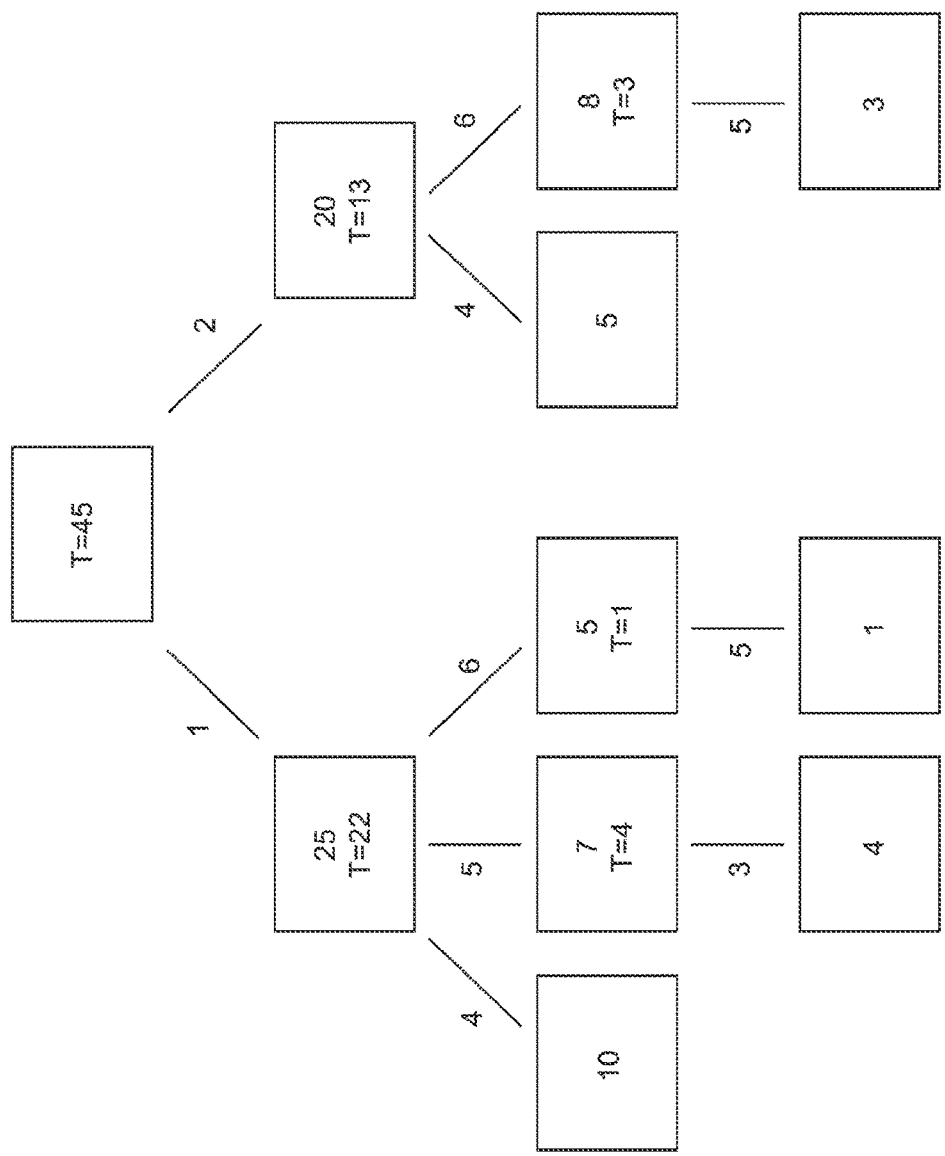
FIG. 6 is a schematic of a dynamic n-gram map.

The n-gram probabilities of a dynamic language model are not stored directly, rather frequency statistics are stored. An example of a dynamic n-gram map is shown in FIG. 6. Each node stores a frequency value, rather than a probability, along with a combined frequency for its children (denoted by "T="). Probabilities are computed on-the-fly from these frequency values by dividing the count for a particular term by the total value at its parent node. A smoothing constant is added to each parent total to avoid unreasonably high estimates for sparse events. The higher the value chosen for the constant, the more slowly the probabilities from the user specific language model will increase (because the probability for a particular term is determined by dividing its count by the value of its parent node). In a preferred embodiment, a smoothing constant of 500 is chosen. However, it will be appreciated that the value of the smoothing constant is a matter of choice.

The advantage of the dynamic language model structure is that it allows rapid updating. However, the disadvantage of this type of language model is that its memory and computational requirements are significantly higher than in its static counterpart.

As stated previously, each language model has two input feeds, the current word input 11 and the context input 12, where the current word input 11 can be used to generate a KeyPressVector 31. In order to generate a single set of predictions 20 for a given language model, the language model must compute the intersection of the set of candidates returned by the approximate trie 13 and optional candidate filter 15, and that returned by the n-gram map 14. Alternatively, the language model must compute the intersection of the set of candidates returned by the probabilistic trie 33 and that returned by the n-gram map 14. A set of candidates is represented by a set of numerical identifiers.

To compute the intersection of the set of candidates returned by the approximate trie and the n-gram map, an intersection mechanism 16 first determines which of the two sets is smaller. The smaller set of identifiers is used as a base set. The mechanism 16 iterates through the base set of identifiers and looks up each identifier in the base set in the other set. If a match is found for the identifier in question, the intersection mechanism 16 places the identifier in a new set which represents the intersection between the two sets. In this embodiment, the probability associated with an identifier in the new set is its probability as stored in the n-gram map. This is because the candidates returned from the approximate trie do not have a probability value associated with them. The approximate trie is interrogated to return possible candidates only.

To compute the intersection of the set of candidates returned by the probabilistic trie 33 and the n-gram map, the intersection mechanism 16 follows the same procedure as set out with relation to the approximate tri 13. However, in the case of the probabilistic tri 33, the candidates returned from the probabilistic tri 33 will have a probability value associated with them. Therefore, if a match is found between the candidates returned from the n-gram map and those returned from the probabilistic trie 33, the intersection mechanism 16 computes the product of the two probabilities and places the identifier, mapped to its resultant probability, in a new set which represents the intersection between the two sets.

The language model can be configured to apply one or more filters to the predictions generated by the intersection mechanism 16. In one embodiment, the first filter that is applied is a bloom filter 17, which is followed by a topic filter 18 and optionally additional filters 19 to generate the output predictions 20 for a given language model. However, in other embodiments the ordering of the applied filters or the types of applied filter can be changed.

A Bloom filter 17 is a randomized data structure used to store sets of objects in a highly efficient manner using bit-arrays and combinations of hash functions. The present system uses an implementation of a multi-bit-array Bloom filter 17 to reorder prediction candidates, generated at the intersection 16, on the basis of higher-order n-gram statistics which for memory reasons cannot be stored in the n-gram map 14. The present system utilizes a technique for associating n-grams 14 with probability values in the Bloom filter 17. A technique to associate Bloom filter entries with probability values is disclosed in Talbot and Osborne, 2007, Proceedings of the 2007 Joint Conference on Empirical Methods in Natural Language Processing and Computational Natural Language Learning, pp. 468-479.

For a given set of prediction candidates and a certain number of context terms, the Bloom filter 17 reorders the predictions to reflect new probabilities. The present system utilizes a log-frequency Bloom filter (Talbot and Osborne) which maps a set of n-gram entries to respective probability estimates. In the present system, the language model generates a set of predictions P based on a set of up to n−1 context terms C. A log-frequency Bloom filter F, which associates n+l-gram term sequences with probability estimates, can be used to generate a new prediction set in which the previous predictions are reordered. For each term prediction t in P, the language model is configured to search F based on a context of c+C+t to yield a new probability value v, wherein C comprises the n−1 terms of preceding text input used to search the n-gram map; t comprises the term predictions in P (those in the determined intersection); and c comprises an extra term of context, immediately preceding the n−1 terms used to search the n-gram map. Therefore, the n+l-gram map of the Bloom filter is searched for each n+1 term sequence, c+C+t, to determine whether that n+1-gram path exists and, if so, the probability associated with that path. A new prediction set is then constructed using the new probabilities. In general, if p is the final number of predictions requested, then the filtering process will operate on a number greater than p (specified a-priori) so that the reordering process may result in a different set of predictions returned to the user.

In some embodiments, the language model can be further configured to apply a topic filter 18. N-gram statistics yield estimates of prediction candidate probabilities based on local context, but global context also affects candidate probabilities. The present system utilizes a topic filter 18 that actively identifies the most likely topic for a given piece of writing and reorders the candidate predictions accordingly.

The topic filter 18 takes into account the fact that topical context affects term usage. For instance, given the sequence "was awarded a", the likelihood of the following term being either "penalty" or "grant" is highly dependent on whether the topic of discussion is 'football' or 'finance'. Local n-gram context often cannot shed light on this, whilst a topic filter that takes the whole of a segment of text into account might be able to.

The function of the topic filter is to accept a set of predictions and yield a variant of this set in which the probability values associated with the predicted terms may be altered, which may consequentially alter the ordering of predictions in the set. Given an input prediction set P and current input text T, the topic filter carries out the following operations: predict a weighted set of categories representing the most probable topics represented in T; predict a weighted set of topic categories for the terms/phrases in P; and modify P such that the probabilities of predictions with similar topic categories to T are inflated relative to those with dissimilar topic categories.

The prediction of topic categories for an arbitrary segment of text is accomplished through the machine learning paradigm of classification, which consists of a framework within which a mechanical 'learner' induces a functional mapping between elements drawn from a particular sample space and a set of designated target classes (see B. Medlock, "Investigating Classification for Natural Language Processing Tasks", VDM Verlag 2008, for a more detailed introduction to classification concepts and methods).

A classifier is employed in the topic filter 18 based on the principle of supervised learning in which a quantity of training data must first be collected and assigned labels representing topic categories. From this data, the classifier learns to infer likely topic category labels for new data. In the present case, an individual data sample is a segment of text. For instance, when building a classifier to label data in the news domain, a collection of news stories is required where each is pre-assigned topic category labels representing its dominant topic(s), e.g. 'sport', 'finance', 'entertainment' etc. The set of topic categories is pre-defined, and may be hierarchical, e.g. 'football' might be a subcategory of 'sport'.

Once the classifier has been trained on pre-existing data, it is able to predict the most likely topic categories for a new segment of text, along with a numerical value for each prediction representing the degree of confidence with which the prediction has been made. For example, given the following text segment, "David Beckham will stay at AC Milan until the end of the season after a 'timeshare' deal was finally agreed with Los Angeles Galaxy", a trained classifier might yield the following category predictions 'sport'→0.8; 'finance'→0.3, wherein the numerical values represent the confidence that the classifier has in that particular prediction. The numerical values can be interpreted as an estimate of the level of representation of that particular topic in the given text segment.

The prediction of topic categories for individual terms/phrases from the prediction set P can be carried out in the same manner as for input text segments, using the classifier. This yields a set of weighted topic category predictions for each term/phrase prediction in P.

The modification of prediction probabilities in P requires the definition of a 'similarity metric' between topic category prediction sets. This takes the functional form: sim(S, S')=v, where S and S' are topic category prediction sets and v is the real-valued output from the function sim, representing the degree of similarity between S and S'. There are many different methods of implementing sim and any one is appropriate. For instance, the topic category prediction sets can be interpreted as vectors in an m-dimensional space where m is the number of topic categories. Under this interpretation, the weight assigned by the classifier to a particular category c is the extension of the vector in the c-dimension. Well-established techniques can be used for estimating vector similarity, e.g. by applying magnitude normalization and taking the inner (dot) product.

Once the similarity metric has been defined, the final stage within the topic filter 18 is to use the similarity values to modify the probabilities in P. A number of techniques can be chosen for accomplishing this, but one possibility is to inflate the probabilities in P by a small value in inverse proportion to their rank when ordered by topic similarity with T, for instance in accordance with the formula, pfinal=pinitial+k/r, where p is the prediction probability drawn from P; r is the rank of the term associated with p, when ordered by sim(Sp, ST) (rank 1=highest similarity); and k is a pre-defined constant.

The language model architecture of the present system is configured such that any number of additional filters 19 can used to reorder candidate probabilities. At each stage, the language model will already possess a candidate prediction set, and if a threshold on computation time is exceeded, the candidate set can be returned and additional filters 19 can be easily bypassed.

The language model returns its predictions 20 as a set of terms/phrases mapped to probability values. As explained in the discussion of FIG. 1, the output predictions 20 from each language model are aggregated by the multi-LM 8 to generate the final set of predictions 10 that are provided to a user interface for display and user selection.

From FIGS. 2A, 2B, 2C and 2D, it can be seen that in the absence of a current word input 11, and therefore the absence of a KeypressVector 31 also, the predictions are based on a context input only 12.

In some embodiments, the system can use beginning of sequence markers to generate a list of word or phrase predictions 9 in the absence of any preceding user input, enabling a user to select a word or phrase to commence the input of a sentence. The system can also use "beginning-of-sequence" (BOS) markers to determine word or phrase predictions after end-of-sentence punctuation and/or after new line entry.

The language models use BOS markers which are used as context 12 in the absence of any preceding user input. In the absence of preceding user input, the language models will generate certain terms such as "Hi", "Dear", "How", "I" etc. because they are more likely than high probability unigram terms such as "of", "to", "a" etc. The predictions from each language model 20 are based on BOS markers. One of the entries in the first level of the n-gram map will be the BOS marker, and this will be used as context in exactly the same way as standard input terms, e.g. if the BOS marker is '^' then the n-gram map might contain (amongst others) the following paths: "^ Dear"→0.2; "^ Hi"→0.25; "^ How"→0.1; and "^ I"→0.15. BOS markers are automatically inserted into the context when a user enters end-of-sentence punctuation (period, exclamation mark, question mark) or enters the 'return' character.

As the user specific language model 7 is a dynamic language model, over time it will learn a user's language style, thereby generating predictions that are more likely to reflect a particular user's language style. However, if the text prediction engine generates a list of word or phrase predictions 9 which fails to include the word desired by the user, the user can tailor the list of words or phrases generated by the text prediction engine by inputting a character 11 through the user interface. The language model then utilizes an approximate trie 13 or a probabilistic trie 33, along with an n-gram map, to generate a list of word predictions based on the current word input 11.

As stated previously, with reference to FIG. 1, the present system utilizes a mechanism 5, static pruning, across all static language models, to reduce the amount of information stored in the system. In the following section static pruning is described in relation to the pruning of a single language model.

Given two language models L1 and L2, the pruning of L1 is achieved by comparison to a reference language model, L2. Each language model comprises an n-gram map, in which terms in the vocabulary are associated with numerical identifiers which are stored in the map and associated with probability values. Because identifiers are assigned to terms such that the resulting ordering is from most-to-least frequent, the identifier that is assigned to a given term in one language model does not necessarily match the identifier assigned to the same term in a different language model. Therefore, to achieve static pruning, the static pruning mechanism 5 generates a conversion table between the vocabulary identifiers in L1 and the vocabulary identifiers in L2. The conversion table maps the identifier for a given term t in L1, to the identifier for the term t in L2. For example, if the term "the" is identified by the numerical identifier 1 in L1 and the identifier 2 in L2, then given the identifier 1 for L1, the conversion table will yield the identifier 2 for L2.

The static pruning mechanism 5 traverses the n-gram map of L1 such that each node is visited exactly once. For each path followed in L1, the corresponding path is attempted in L2 by using the conversion table to convert the path identifiers in L1 to those of L2. The static pruning mechanism 5 conducts a binary search to locate specified subsequent child nodes. For example, if the context comprises term1 and term2, the static pruning mechanism 5 will first locate the node for term1. Term2 is then the specified child node that will be searched for. By conducting such a search in L2, identical paths can be identified. If no identical path exists in L2, the static pruning mechanism 5 moves on to search in L2 for the next path of L1. If an identical path exists in L2, then the static pruning mechanism 5 makes a comparison of the probabilities at each node. If the L1 probability is smaller than the L2 probability, and the node is terminal, then the static pruning mechanism 5 removes this node from L1.

Figure 7:
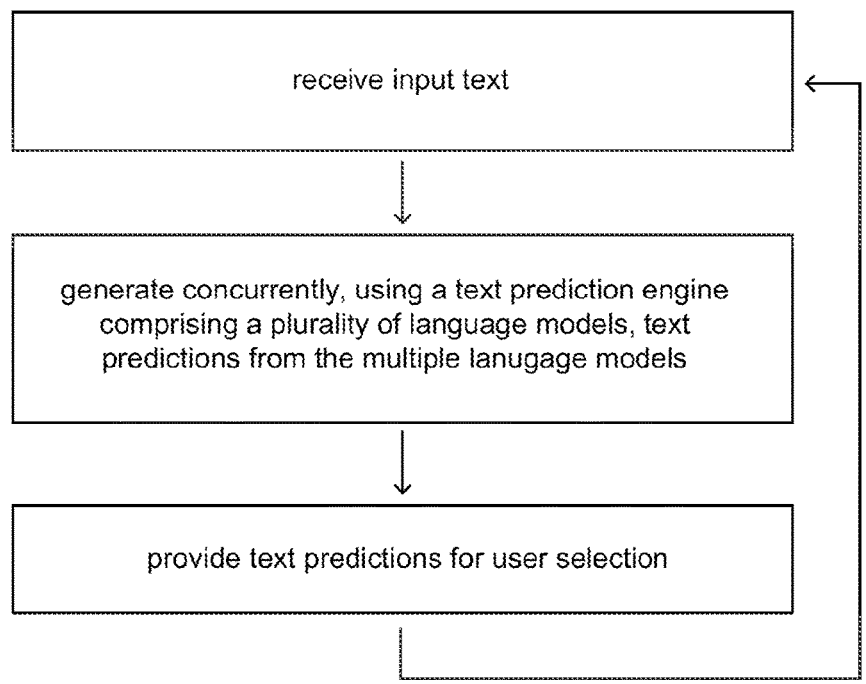
FIG. 7 is a flow chart of a method for processing user text input and generating text predictions for user selection according to the disclosure.

A method according to the present disclosure is now described with reference to FIG. 7 which is a flow chart of a method for processing user text input and generating text predictions. In the particular method described, the first step comprises receipt of text input. Analogous to the foregoing discussion of the system according to the present disclosure, the text input can comprise current word input 11 (which can be represented by a KeyPressVector 31) and/or context input 12. Therefore, the input stream can comprise character, word and/or phrase inputs and/or punctuation inputs. In embodiments where the predictive text engine also predicts punctuation, the punctuation items are stored in the n-gram maps with the text terms. Single punctuation items ('!', '?') and blocks of punctuation ('!!!!!!!', ' . . . ') are handled as single prediction units.

The method further comprises the steps of generating concurrently, using a text prediction engine comprising a plurality of language models, text predictions from the multiple language models; and providing text predictions for user selection. As shown in the flow chart of FIG. 7, a loop is formed when a user inputs a sequence because this sequence, which may include terms selected from previous prediction sets, is used to update the dynamic language model which contributes to the next set of predictions 9. The loop is formed by the insertion of an end-of-sequence punctuation mark, or a 'return' keypress for example. Hence, predictions are constantly updated based upon previous sequence inputs.

By way of an example, say a user has already entered the sequence "Hope to see you" and is intending to enter the terms "very" and "soon" in that order. The final prediction set 9 that is provided by the text prediction engine 100 to a user interface for display and user selection, may comprise 'all', 'soon', 'there', 'at', 'on', 'in'.

The intended next term "very" is not in the currently-predicted list of terms. The user can enter multi-character 'v/x/z' input to prompt the predictive text engine 100 to provide more relevant predictions. The information about the current context "Hope to see you" and the currently-entered multi-character 'v/x/z' is passed to the text prediction engine 100 where the Multi-LM 8 tokenises the context and adds the beginning-of-sequence marker '^': "Hope to see you" →"^" "Hope" "to" "see" "you".

The Multi-LM 8 then passes the tokenised sequence data 12 and the multi-character current input 11 to each of the language models. Each language model receives a copy of the current input 11 and the tokenised context 12.

Within each language model, the current input (which may be represented as a KeyPressVector 31) is fed into the approximate trie 13 or the probabilistic trie 33, which in this case returns the set of identifiers for all vocabulary terms that begin with either 'v' or 'x' or 'z'. It accomplishes this by following the initial paths to the nodes corresponding to the characters 'v', 'x' and 'z', concatenating the identifier value sets found at each node and returning the combined set. In the case of the identifiers being returned by an approximate trie 13, the set of identifiers can be narrowed using a candidate filter 15. However, in the present example, no filtering is required because the length of the current input will be less than the maximum depth of the approximate trie. Candidate filtering is only necessary when using an approximate trie 13 and even then, only when the length of the current input exceeds the maximum depth of the approximate trie, which as noted previously, to be of any use, must be at least 1, and usually around 3-5. The depth of the approximate trie is specified a-priori for each language model.

Using the tokenised context 12, the n-gram map 14 is queried by the language model for a given n-gram order, i.e. a number of context terms. Each language model contains n-grams up to a maximum value of n. For example, a particular language model may contain 1, 2 and 3-grams, in which the maximum n-gram order would be 3. The system begins by taking the largest possible amount of context and querying the n-gram map to see if there is an entry for the path representing that context. So, for example, if a given language model has a maximum n-gram order of 3, in the present example, the system would begin by searching for the path corresponding to the context phrase "see you". The system then extracts the first k children of the node corresponding to this path, where k is an a-priori parameter of the system. In static language models, each child node contains a term identifier and a compressed probability value that can be extracted directly for use in prediction ordering. In dynamic language models, the node contains a frequency value which must be normalized by its parent 'total' value to yield a probability.

Given a set of identifiers from the approximate trie 13 or set of identifiers mapped to probability values from the probabilistic trie 33, and a set of identifiers mapped to probability values from the n-gram map 14, the intersection is computed by an intersection mechanism 16. If the number of predictions in the resulting set is less than p, or some multiple of p (where p is the required number of predictions), the system continues to look for further predictions by returning to the n-gram map 14 and considering smaller contexts. In this example, if the context "see you" did not yield enough predictions, the system would consider the context "you" (second level in the n-gram map), and if that still did not yield the required number, the system would revert to an empty context (first level in the n-gram map).

In the present example, the system has previously searched for the path corresponding to the context phrase "see you". At this stage, the language model has obtained a set of predicted terms which are compatible with the context and the current input (which may be represented by a KeyPressVector 31), ordered by their respective probability values, as extracted from the n-gram map. For example, the prediction set may comprise the identifiers corresponding to the terms "very", "visit" and "x". A new prediction set is generated, with the previous predictions re-ordered, by using the Bloom filter component 17. In this case, the Bloom filter might contain 4-gram sequences associated with probability estimates. The language model would query the Bloom filter using a new context comprising the previous context used to search the n-gram map ("see you"), the set of current predictions ("very", "visit" and "x"), and optionally, an extra context term (in this case "to"). Hence, in this example, the Bloom filter would be queried using the following sequences: "to see you very"; "to see you visit"; and "to see you x".

The probabilities mapped to the terms "very", "visit" and "x" in the current prediction set would then be replaced by the values returned from the Bloom filter and consequentially reordered. Additional filters would operate in a similar manner. In general, if p is the final number of predictions requested, then the filtering process would operate on a number greater than p (specified a-priori), such that the reordering process may result in a different set of predictions returned to the user.

Once all filters have been applied, a set of predictions (terms+probability values) 20 is returned by each individual language model to the Multi-LM 8, which then aggregates them by inserting all predictions into an ordered associative structure, or an STL multimap, and choosing the p most probable and returning them as the final prediction set 9. In our example, the prediction set 9 presented to the user might be 'very', 'via', 'visit', 'view', 'x'.

The intended term "very" now appears on the prediction list and can be selected. Once selected, the context, now including the term "very", becomes "Hope to see you very" and the current input is empty. The preceding method steps are iterated in the same manner, except that this time the approximate trie or the probabilistic trie is bypassed (because there has been no character entry, i.e. no current word input), and the prediction candidate set is drawn solely from the n-gram map. This might yield the following prediction set 'much', 'soon', 'good', 'many', 'well'.

The term "soon" occurs in the prediction set, so the user can select it, and once again the context is updated, this time to include the new term, "Hope to see you very soon", and the current input is set to empty. This process continues to iterate as input progresses.

When the user ends a sequence by pressing 'return' or an end-of-sequence punctuation term, the user interface is configured to pass the current sequence to the text prediction engine 100, wherein the Multi-LM 8 is configured to 'tokenise' the current sequence which it then passes to the user specific language model 7. The dynamic language model 7 assigns numerical identifiers to the tokenised input 12 and updates the n-gram map 14. Using the same example, consider that the user subsequently adds an exclamation mark at the end of the sequence to yield: "Hope to see you very soon!". The following stages would occur: The Multi-LM 8 tokenises the sequence and inserts the BOS marker, "Hope to see you very soon!" becomes, for example, "^" "Hope" "to" "see" "you" "very" "soon" "!"; and for each term in the sequence (and its respective context), the dynamic language model adds n-gram paths to the dynamic n-gram map constituting varying context lengths, from no context to n−1 terms of context, where n is the maximum n-gram order for the language model. For instance in the case of the above example, assuming n=4, the following paths would be added:

---

"^"
"Hope"
"^" "Hope"
"to"
"Hope" "to"
"^" "Hope" "to"
"see"
"to" "see"
"Hope" "to" "see"
"^" "Hope" "to" "see"
"you"
"see" "you"
"to" "see" "you"
"Hope" "to" "see" "you"
"^" "Hope" "to" "see" "you"
"very"
"you" "very"
"see" "you" "very"
"to" "see" "you" "very"
"soon"
"very" "soon"
"you" "very" "soon"
"see" "you" "very" "soon"
"!"
"soon" "!"
"very" "soon" "!"
"you" "very" "soon" "!"

---

For each n-gram path, the dynamic language model 7 increments the frequency value of the corresponding node by one, and also increments the total value for the parent by one. If a given term does not exist in the dynamic language model vocabulary, it is added by the language model, and assigned a new identifier.

Figure 8:
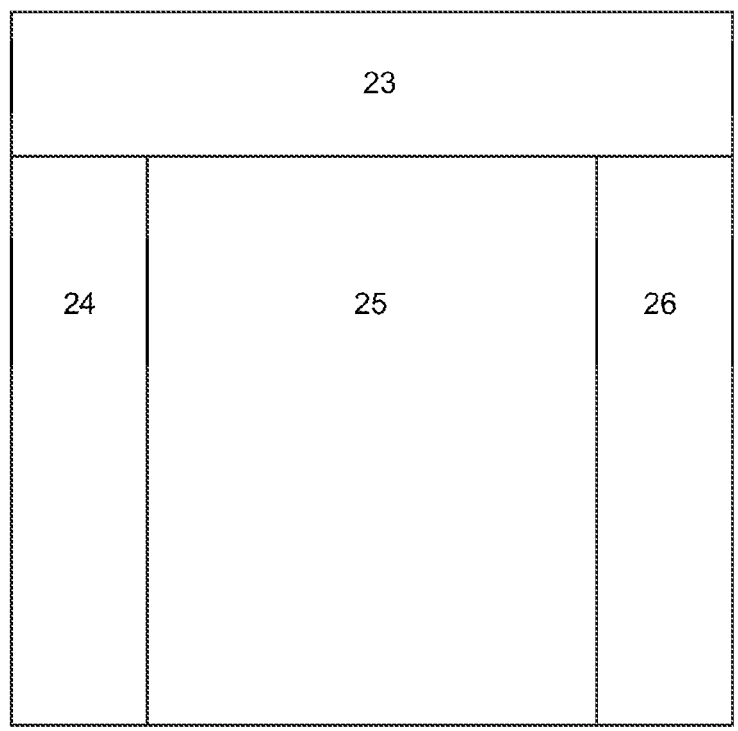
FIG. 8 is a schematic of a user interface according to the disclosure.
Figure 8A:
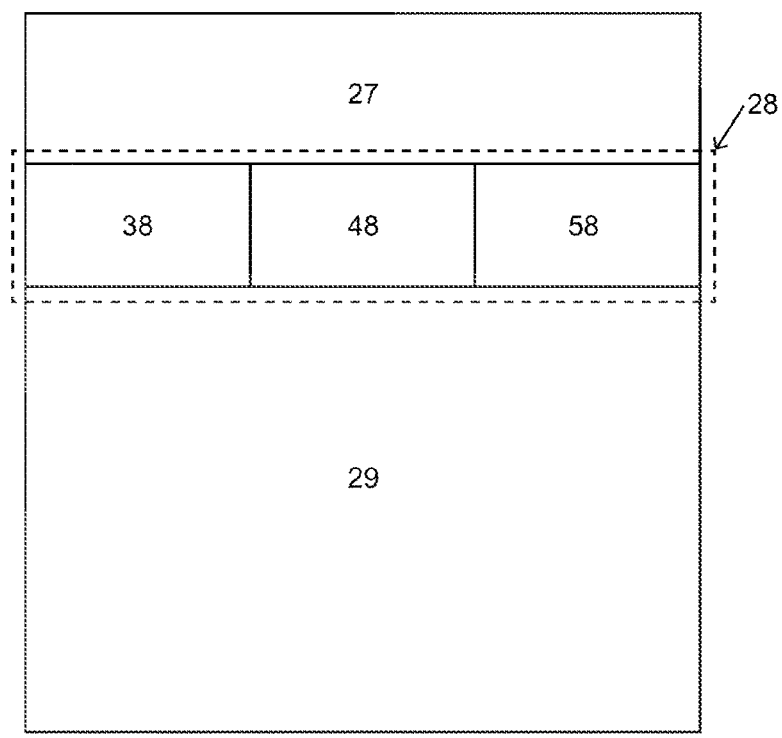
FIG. 8A is a schematic of an alternative user interface according to the disclosure.

The present disclosure also relates to a user interface. In particular it relates to a touch-screen interface, through which the system of the present disclosure can be operated. FIG. 8 provides a schematic representation of a generic user interface. FIG. 8A provides a schematic of an alternative generic user interface. As shown in FIG. 8, the basic user interface comprises a typing pane 23, a text prediction pane 25 which may be located centrally for example and two identical panes, which may be located to the sides, for single/multi character, punctuation or symbol entry 24, 26. In the alternative embodiment, as shown in FIG. 8A, the basic user interface comprises a typing pane 27, a prediction pane 28 and a single pane for single/multi character, punctuation or symbol entry 29. The prediction pane 28 comprises an actual character entry button 38, a most likely word button 48 and an alternative word button 58.

In the embodiment according to FIG. 8, the prediction pane 25 comprises a set of buttons, each button displaying a word from a set of words or phrases that has been predicted by a text prediction engine. The typing pane 23 comprises a pane in which user inputted text is displayed. The side panes 24, 26 can comprise a set of buttons corresponding to character, punctuation or numeral keys. In the case of the default screen, the side panes 24, 26 comprise character buttons. However, in other configurations panes 24, 25, 26 are all used for character, punctuation and numeral buttons, and the screens are toggled so that a user can move between prediction, numeral and punctuation screens.

The difference between the two user interface embodiments is in the prediction pane 25, 28. In the alternative embodiment, the prediction pane 28 comprises an actual character entry button 38 which enables a user to input the sequence of characters they have typed into the system (rather than entering a word that has been predicted by a text prediction engine of the system). This enables the user to input words which are not recognized by the system and which would not therefore be predicted by the system. The prediction pane 28 also comprises a most likely word button 48 which displays the word with the greatest probability associated with it from a set of words or phrases predicted by a text prediction engine. The prediction pane 28 also comprises an alternative word button 58 which displays a word other than the word with the highest probability (i.e. the word with the second highest probability). Pressing either of the buttons 48 and 58 will cause the associated word to be entered.

In both embodiments of the user interface, the typing pane 23 displays the text entered by a user. A user is able to scroll up or down previously typed text which is displayed in the typing pane, enabling the user to view and edit the text. The typing pane can also comprise a cursor which can be moved to facilitate the editing of the entered text.

The interface is arranged such that when a word button from the prediction pane 25, 28 is pressed, that word is selected and appears in the typing pane 23, 27. The updated input sequence comprising the selected word and its preceding context is passed to the text prediction engine for new prediction generation. In the embodiment of FIG. 8A, the user enters the most likely word by pressing the most likely word button 48 or by entering a space.

In the embodiment of FIG. 8, when a word button is held (for a specified amount of time) or in response to a left-to-right gesture, the current input sequence, excluding the term in question, is passed to the text prediction engine, and the word is displayed in the 'typing pane'. The word is not completed (i.e. a space is not automatically entered after the word), but the letters are used as input for further prediction. For example, if the word 'not' is held, then the text prediction engine generates a list of word predictions 9 including for example 'note', 'nothing', etc., which is provided to the user interface for display and selection in the prediction pane 25. If the language model predicts punctuation, the punctuation terms appear in the same location as the predicted words or phrases, at the bottom of the prediction pane 25, thereby providing the user with consistency. In the alternative user interface of FIG. 8A, the current input sequence is displayed in the typing pane 27 in real time. The actual character entry button 38 also displays the current input sequence, and this is shown alongside the current most likely word button 48 and the alternative word prediction 58. If the user wishes to select the input sequence they have entered, rather than a predicted term, the user presses the actual character entry button 38 to enter this inputted sequence as a finished word.

The user interface of FIG. 8 can be configured for multiple word (phrase) input. An example of two-term phrase input is discussed in relation to a predicted phrase of "and the". In the central prediction pane 25, a button containing the word "and" will be displayed next to, and to the left of, a button containing the word "the". If the user selects the term "the", the sequence "and the" is entered. However, if the user selects "and", only "and" is entered. The same principle can be applied to arbitrary length phrase prediction. The same principle can be applied to the user interface of FIG. 8A, where the most likely word button 48 can be configured to display a phrase input. For example, the most likely word button 48 can be divided into two or more buttons if the most likely prediction is a two or more term phrase, and the alternative word button 58 can show the next most likely phrase prediction.

Character buttons can be displayed in the two side panes 24, 26 or a single main pane 29. The character buttons can have dual or tri character behavior. This means that either two or three characters are submitted concurrently to the predictor (e.g. if an 'A|B' button is pressed then 'A' and 'B' are submitted). In an embodiment this is the default behavior on the default screen. The dual character buttons are designed with multi-region behavior. For instance, pressing the left side of the 'A|B' key will input 'A', the middle region will give both 'A' and 'B', the right side will input 'B' (this combines the benefit of larger, more accessible multi-character buttons, whilst at the same time allowing experienced users the benefit of higher prediction accuracy resulting from single character input). In an embodiment this is optional behavior on the default screen. Multitap is used when it is necessary to type characters unambiguously (e.g. for entry of a new word that is not in the language model vocabulary). In an embodiment to enter characters unambiguously, a user presses a toggle button to go to a numbers/punctuation screen where all buttons are multitap.

For numbers or punctuation, all buttons are multitap. For example, with tricharacter buttons, the user can press once to enter the first term (of the three term button), press twice to enter the second term, or press three times for the third term to be entered.

The interface can also comprise one or all of the following additional features: a menu button which toggles the screen between prediction, numbers and punctuation, and further punctuation screens; a return button to start a new line of text; a space button to enter a space when pressed or repeatedly enter a space when held; a delete button to delete individual characters when singularly pressed or repeatedly delete characters or words when held; a capitalization button which toggles between Abc (where only the first letter is capitalized), ABC (all letters capital) and abc (all letters lower case); a send button to send the inputted text as an email (this is specific to an email focused application).

Furthermore, the interface can optionally include an 'undo' button or it can be configured to be responsive to an 'undo' gesture, which is a gesture on a delete button (e.g. movement from left to right). In response to this gesture, or button press, the interface undoes the previous term selection, placing the user back at the position prior to term selection.

For example, if a user has entered 'us' by character input, they will be presented with a selection of word predictions based on this input. In an example where they accidentally select the word "usually" rather than the intended word "useful", the undo gesture allows a user to undo the word selection and return to the original predictions based on 'us', thereby enabling them to select 'useful'. This saves the user from repeatedly pressing the delete button to remove the characters accidentally entered by the incorrect word selection.

In another example, the system may be configured to automatically select the most likely prediction corresponding to a user's input, for example by providing automatic correction of the characters input by a user, or automatic completion or prediction of the word the user is currently inputting via the character entry mechanism.

In this disclosure the term 'prediction' encompasses correction or completion of the word currently being typed by the user or the prediction of the next word based on context (with or without current word input). A prediction based on user input can be generated using a text prediction engine as described above, by a language model as described above, or by one or more other language models, dictionaries or known text prediction/completion/correction systems.

It may be desirable to automatically select the most likely prediction, without displaying one or more predictions for user selection. Thus, the automatic selection is made without user intervention and, in one embodiment, without the prediction being displayed to the user prior to automatic selection. In one embodiment, the automatic selection of a prediction may occur in response to the user signaling that their current word input is complete, for example by inputting a space/period or a punctuation mark.

For example, the user may input via the input entry mechanism "usualy", followed by " ", and the system may, in response to " ", automatically select the text prediction "usually", which prediction corresponds to a corrected version of the user's input. Thus, in the typing pane, the user interface will first display the user's input characters "usualy", and then will automatically select the correction "usually" in response to the input of the space character, and thus replace "usualy" with "usually" in the typing pane. This correction may replace the word the user is currently entering, e.g. replacing the input "usualy" with "usually", or may occur in preceding words of text input, for example correcting "on the future" to "in the future", where the user input "on" has been replaced by the text prediction "in". Words subsequently entered by the user are used as context to interpret whether a preceding word is correct and, if not, automatically correct that preceding word. The correction of a word preceding the current word may occur after the current word has been entered or after a space character has been input.

As discussed above, the system may also be configured to automatically select the most likely prediction, which may correspond to a prediction or completion of what the user is intending to input via the input entry mechanism, for example the most likely text prediction/completion for "us" might be "use" depending on the context in which the word is used.

When the user interface is configured to automatically select a prediction to replace a user's input, the situation may present where the user intended to type what they input, and the interface has automatically replaced the intended input with the most-likely text prediction. This situation may occur when the user's text input is not recognized as a valid input. For example, when the user types "Hello Ty" and enters a space/period (e.g. by pressing the spacebar) to begin typing the next word, the user interface may correct this text to "Hello to", as 'to' is a valid word, and may be seen in a phrase such as "Hello to you too".

In such a scenario, the undo button as previously described allows a user to automatically return to their original input. For example, if "Hello Ty" has been automatically corrected to "Hello to", the user can revert the original input "Hello Ty" by selecting (via a press or gesture) the undo button. In response to selection of the undo button, the original input is once again displayed in the typing pane (i.e. the original input replaces the selected prediction). Similarly with the above example, by selecting the undo button, the typing pane will replace "in the future" with the original user input "on the future".

Thus, the user interface of the present disclosure can be configured to replace user input text displayed in the typing pane with a selected prediction, where that prediction is selected by a user from one or more predictions displayed in a text prediction pane or by automatic selection of the most-likely prediction by the system. In either scenario, user or automatic selection of a prediction, the user interface comprises a undo button which, when selected (via a user press or gesture), causes the prediction to be replaced with the original user input.

As will be understood from the above disclosure, an entry mechanism (for example a user keypad) is for entering an input comprising at least one of a character, symbol, numeral or punctuation. For example, as described above, the user may be able to scroll through a character keypad, a numeral keypad and a punctuation/symbol keypad, or the keypad can be a multi-character keypad designed to enter one of a number of different inputs, which can comprise one or more of a character, symbol, punctuation mark and a number on a single key. The entry mechanism may also comprise one or more of a backspace button, a return button and a send button.

The prediction may be a text prediction, e.g. a word or phrase prediction. However, the prediction could be other text for example, a hashtag, a URL address, etc and could be a graphical symbol, for example an emoji. In the case of an emoji, the characters and or symbols/punctuation entered by the user can be replaced with the corresponding emoji (either automatically or via user selection). Furthermore, where an emoji is predicted on the basis of the preceding user input, e.g. wherein "I am" is predicted from "I am h" (e.g. using an n-gram map comprising the emojis in given contexts), the emoji may be automatically selected by the user interface or may be presented to the user (e.g. via a prediction pane) for user selection. As discussed above, the user can return to the original input (rather than the graphical symbol) via the undo button.

The current system includes automatic capitalization at the beginning of sentences. However, toggling the ABC, Abc and abc options means that the language model will only predict words of the correct form, i.e. if the capitalization toggle key is set to Abc, the prediction engine will search for terms that follow this capitalization scheme, e.g. 'Jon' 'Ben' 'Cambridge' etc.

Thus, the difference between characters input by a user and a prediction based on those characters may the capitalization of one or more of the characters. For example, if the user inputs "benjamin" via the character entry mechanism, the text prediction engine may predict "Benjamin". If this prediction is selected (by the user or automatically by the user interface), the input "benjamin" will be replaced with "Benjamin" in the typing pane, and the user can revert back to the original input without capitalization by selecting the delete/undo button, as described above.

Furthermore, the system may also be predicting punctuation (e.g. by including punctuation in the n-gram maps as disclosed above), such that the difference between what is input by the user and what is predicted is one or more punctuation marks and/or spaces/periods, for example predicting "we'll" from "well" given the context. The undo button can therefore function to undo the prediction punctuation, e g taking the user back to "well" when "we'll" has been predicted.

In one embodiment, the undo button is a button or pop-up on the input entry mechanism, e.g. the keyboard or keypad. Thus, the button is distinct from the typing pane, e.g. is separate, remote or distanced from the typing pane. In alternative embodiments, the undo button can be a pop-up in the typing pane or can be displayed in the text prediction pane.

In one embodiment, the undo button displays the original user entered input which will be entered if the undo button is selected, for example when the undo button is a button of the text prediction pane or is a pop-up in the typing pane.

In either scenario (user or system selection of a prediction), the undo button may be a button or pop-up dedicated to performing the replacement of a selected prediction with the original user input. Alternatively, the undo button can be a button associated with multiple functions. For example, undo button can provide the undo function under certain circumstances only, for example when receiving a user gesture, such as a swipe across the button, it can function as an undo button, and when receiving a user tap or press it can function as a backspace/delete button for deleting individual characters or as a return or send button. In one embodiment, the user interface may enable/disable certain functions of the button dependent on the current input, for example, enabling the undo functionality after a prediction has been selected but prior to further user input (which will be described in more detail below).

In one embodiment, the undo functionality is enabled in response to selection of a prediction (whether user or automatic selection of the prediction). The enablement of the undo functionality may be visually indicated to the user, as will be described below. For example, if the user has entered "on the futrue", "in the future" may be predicted. In response to selection of the prediction, the undo button is enabled, such that when selected, the typing pane reverts to the original input "on the futrue".

Figure 9A:
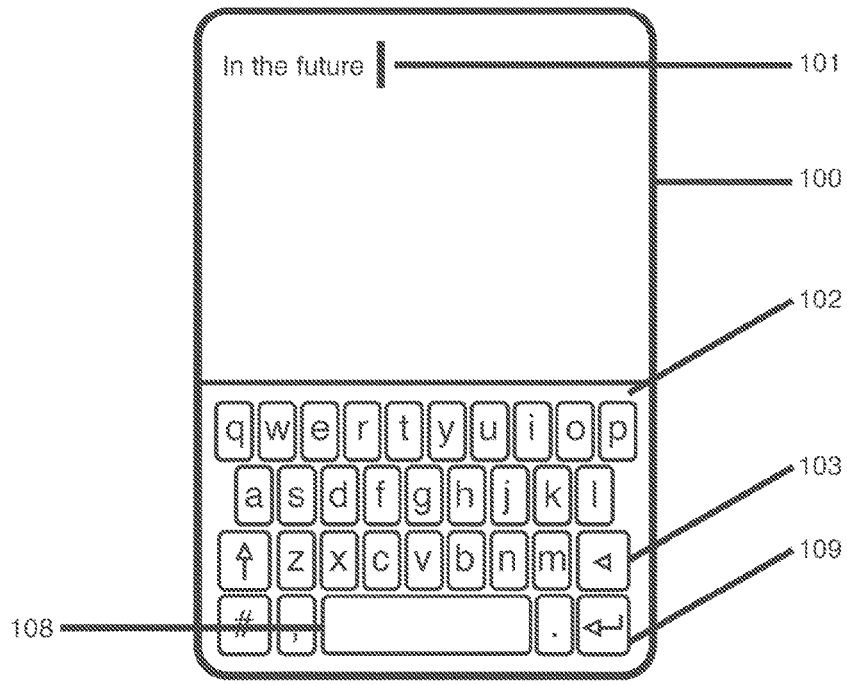
FIGS. 9A and 9B are schematics of a user interface including an undo functionality in accordance to the disclosure.
Figure 9B:
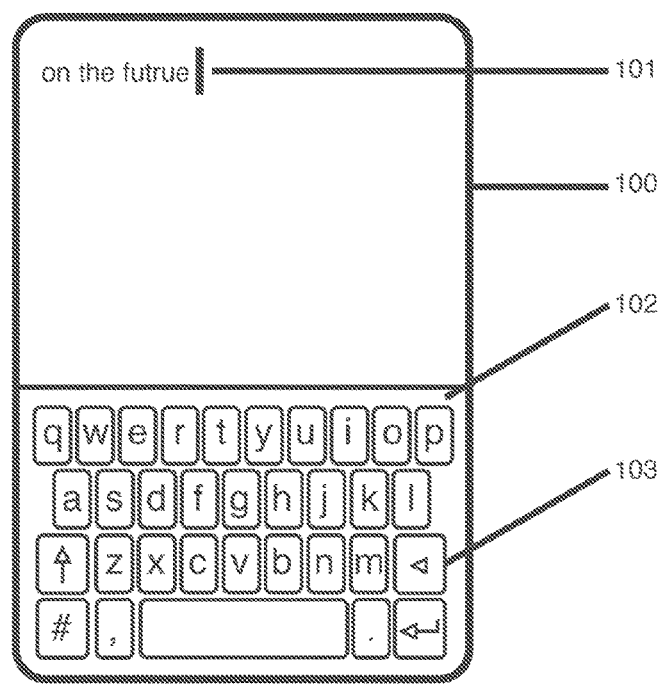

FIG. 9A illustrates an example of a user interface 100 where the prediction "In the future" has been automatically selected and displayed in the typing pane 101 in response to user input "on the futrue". FIG. 9B shows the original user input "on the futrue" which is displayed in the typing pane 101 when a user has selected the undo button, which in the illustrated example is a backspace button 103 of the entry mechanism 102. In this example, the user has inserted a space/period (using spacebar 108) after the term "futrue" which has signaled the end of the current term input and triggered the automatic selection of the prediction, which will be described in more detail later. As will be understood from the above disclosure, the undo button may alternatively correspond to an enabled undo function of the return button 109 or a send button (not illustrated). The enablement of the undo functionality may be indicated (not shown) by the multifunction key changing the displayed symbol, e.g. the backspace button can change form displaying a backward arrow to indicate backspace functionality to a backward rotating arrow to indicate undo functionality.

Figure 10A:
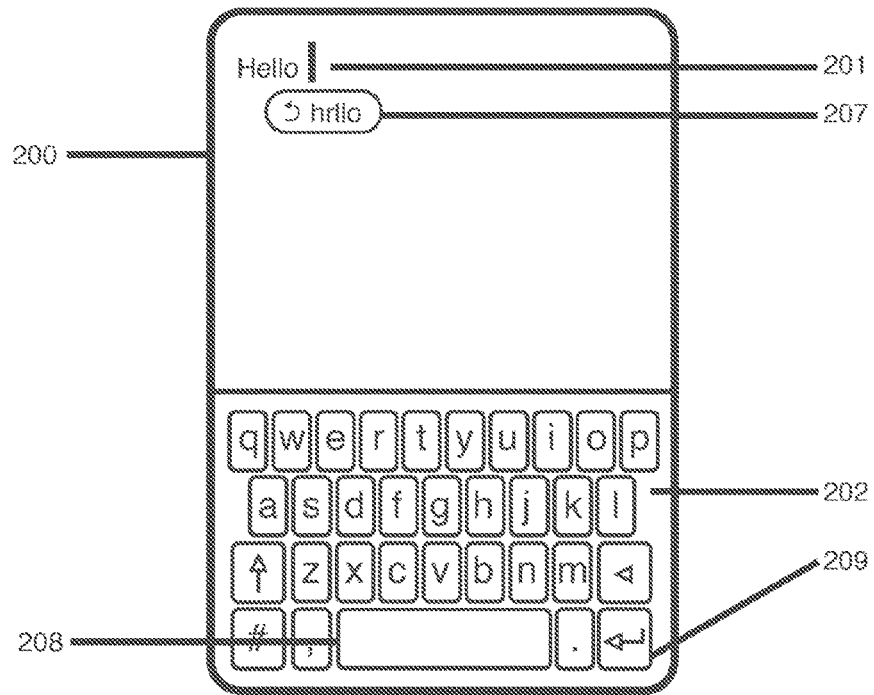
FIGS. 10A and 10B are schematics of another user interface including an undo functionality in accordance to the disclosure.
Figure 10B:
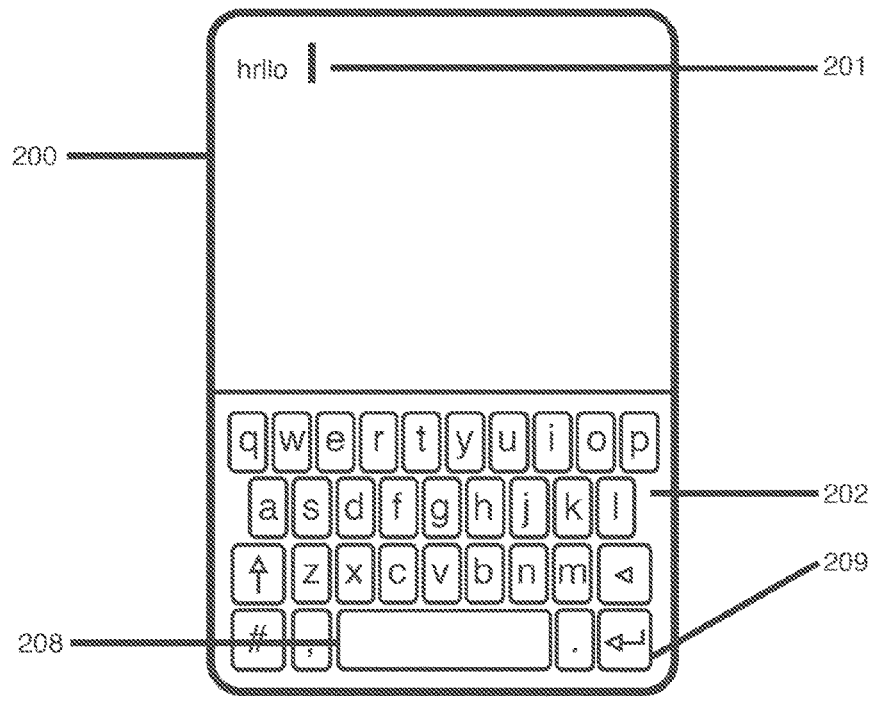

FIG. 10A illustrates an example of a user interface 200 where the prediction "Hello" has been selected (e.g. by user selection of a pop up correction or automatic selection by the system) and displayed in the typing pane 201 in response to user input "hrllo". In this example, the undo button 207 is a pop up button in the typing pane 201, which may display the original user input. FIG. 10B shows the user interface 200 after user selection of the undo button 207. As shown, the user input "hrllo" is displayed in the typing pane. The undo button may display an undo symbol, e.g. an anticlockwise arrow and/or the input which will be inserted upon user selection of the undo button.

Figure 11A:
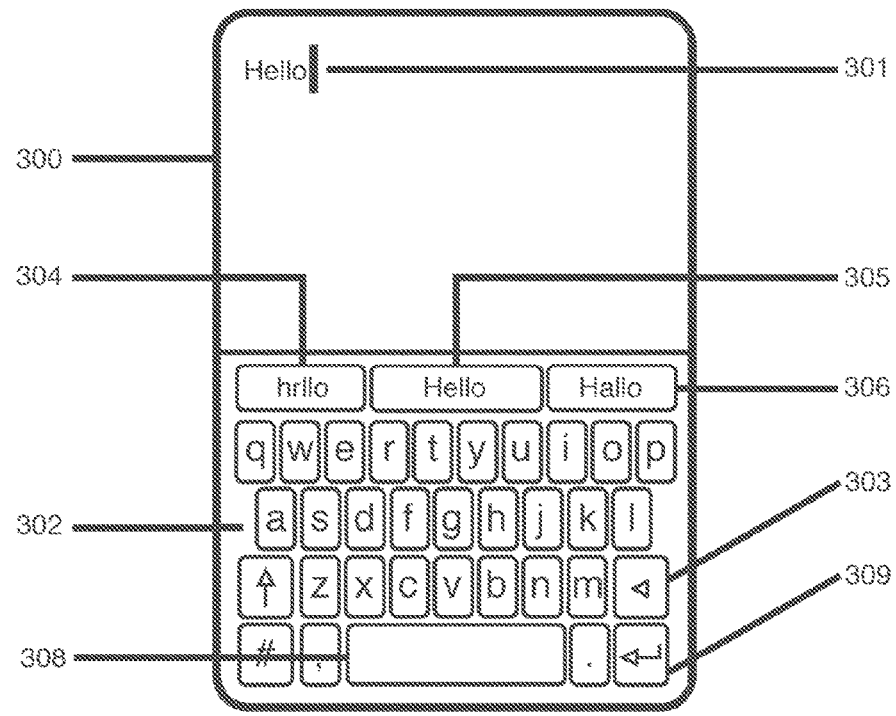
FIGS. 11A and 11B are schematics of another user interface including an undo functionality in accordance to the disclosure.
Figure 11B:
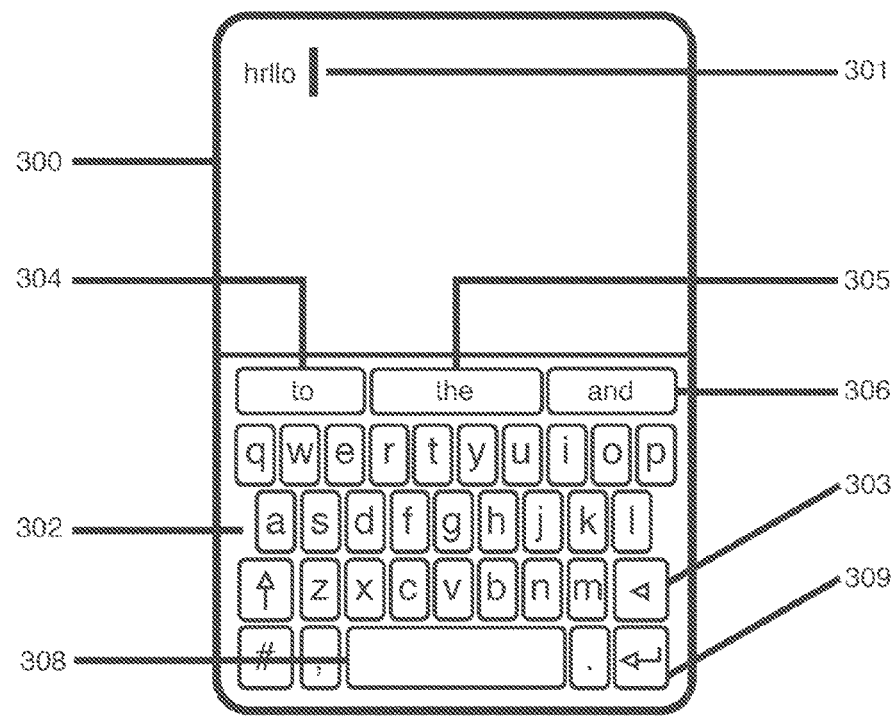

In another embodiment, the undo functionality may be enabled in response to selection of a prediction and a subsequent one or more selections of the backspace/delete button, the subsequent one or more backspace selections triggering the undo functionality. One such example is shown in FIGS. 11A-B. FIG. 11A illustrates an example of a user interface 300 where the prediction "Hello" has been selected for the user input "hrllo", in this case via user selection of a prediction 304, 305, 306 in the prediction pane or by automatic selection of the most-likely prediction of those displayed (for example, in response to the user inserting a space/period via the spacebar 308). "Hello" is displayed in the typing pane 301 and the undo functionality is enabled in response to selection of the backspace button 303. In response to the selection of the backspace button, the space is removed from the typing pane, as shown in FIG. 11A, and an undo button 304 is displayed, which undo button corresponds to the button 304 displaying the original user input "hrllo" in the prediction pane. Upon selection of the undo button, the original user input is again displayed in the typing pane 301 and the candidate pane now displays the predictions 304, 305, 306 for the next word following the user input. The undo button may instead, or in addition, display an undo symbol, as described above.

In another embodiment, the prediction may be selected automatically by the system, for example automatic correction of the user's text input as described with respect to FIGS. 9A-B, and one or more backspace/delete buttons 103 selections are required to trigger the undo functionality on the delete/backspace button 103. For example, the user may have entered "hrllo." which may have been auto-corrected to "Hello." The undo functionality may be triggered when the cursor is to the right of the word, i.e. after the user has first deleted the space and then the full stop. Thus, the undo functionality may be enabled (i.e. when a further press of the backspace/delete button undoes the prediction rather than deleting an individual character, numeral, symbol or punctuation mark) after the user has deleted a space to arrive at the characters of a word that has been replaced (e.g. "hrllo" with no full stop) or after the user has deleted a space and a punctuation mark (in the case of "hrllo.").

Whether the prediction is selected by the user or by the system, and whether the undo button is displayed as part of the typing pane, the entry mechanism (e.g. keyboard/keypad) or the prediction pane, once the user has started to enter further input (i.e. input of a character, symbol, space/period, punctuation mark or numeral), the undo action may be disabled. For example, the undo button can be an overloaded backspace/delete button which is available as a backspace button until a prediction is selected at which point it becomes an undo button, prior to further user input. In response to selection of the undo button or in response to further input via the entry mechanism, the undo button may switch back to being a delete/backspace button, enabling the user to delete one or more individual characters, symbols, numerals and punctuation marks from the original user input.

The undo functionality may be enabled between each prediction selection, where this undo functionality can span across multiple terms/words/etc., as illustrated in the examples below.

In one example, if a user inputs the text "thjs", this may be automatically corrected by the system selecting the corrective prediction "this". If a user then enters further input "this ia", the system may select the most likely prediction (correction) to display "this is". If the user subsequently selects the undo/delete button, the text displayed in the typing pane will return to "this ia" and not "thjs ia", since the undo button is configured to revert the changes made in the last prediction selection only (and not any prediction selections preceding the last one).

In another example, if the user enters "on the futrue", the system may predict "in the future". If the system automatically selects the prediction "on the future", the user is able to return to "in the futrue" by pressing the undo button on the user interface. Since the prediction comprises multiple words (correcting "on" to "in" and "futrue" to "future"), both will be reverted in response to the selection of the undo button.

When multiple terms are altered in a single prediction, e.g. "well see you tehre" to "We'll see you there", the undo button may be configured to revert back to the original text in one step or may revert the alterations in a sequential manner, for example by type of alteration (text/punctuation/capitalization, e.g. from "We'll see you there" to "We'll see you tehre" to "Well see you tehre" to "well see you tehre"). Alternatively, the undo button can revert the alterations back to the original text in sequential order (e.g. "We'll see you there" to "We'll see you tehre" to "Well see you tehre" to "well see you tehre").

In another example, where the user has entered "on the future", the system may apply a corrective action to display "in the future", and the user may then enter "thjs", which may be corrected to "in the future this". Selection of the undo button will revert to "in the future thjs". Since the correction of "on" to "in" was not part of the last prediction selection, it remains displayed in the typing pane without being reverted to the original user input.

In another example, if the user enters "on teh", the user or system may select the correction "on the", and the user may enter additional text, for example "future". The correction "in the future" may then be selected. Selection of the undo button will revert the text to "on the future" since this is the only text altered via the last prediction selection. The user had the opportunity to revert to "teh" but chose not to do so.

As illustrated by the above examples, in one embodiment, only the most recent prediction selection is reverted to the original user input, however, that prediction may correspond to a correction to a word preceding the current word, and can correspond to correction of multiple words.

Although the above examples have been described with respect to automatic selection of a prediction by the system, it will be understood that the examples are equally applicable to user selection of the prediction from a plurality of predictions displayed in a text prediction pane or a display area of the user interface, whereupon selection of the undo button, the user interface is configured to replace the prediction with the user original input in the typing pane and display the previous text predictions for user selection in the prediction pane or display area. Similarly, although described with respect to the undo functionality being enabled in response to prediction selection, the above examples are equally applicable to the undo functionality being enabled in response to one or more backspaces selections after the selection of a prediction (as described above). In that case, any spaces are first deleted along with any punctuation prior to the undo functionality being enabled.

In any of the described examples enablement of an undo functionality involving replacement of a prediction with the user's original input can be brought to user's attention using a visual indicator such as a flash of the new text to be displayed. In one embodiment, more than one undo indicator could be made visible to the user so they can undo replacements prior to the most recent one, for example based on undoable flags, as described below. Furthermore, another visual indication for highlighting enablement of the undo functionality might be a change in the symbol or icon displayed on the undo button, for example button 103, 203, 303 may show a back arrow (as shown in the figures) to signify a backspace/delete button when the backspace/delete functionality is enabled, and that symbol may change to an anticlockwise arrow (not shown) to indicate that the undo functionality is active and selectable. Similarly, if the send button (not shown) or enter button 109, 209, 309 provide the undo functionality at a certain point in the input of text, the icon on these buttons can change to indicate the change in the function of the button.

Once the undo button has been selected, it may be desirable for the system to disable automatic prediction selection and/or the prediction generation and display, to allow a user to delete or input further characters, symbols, numerals and punctuation marks, without having their input altered. In one embodiment, the user interface is configured to disable the automatic prediction selection until a certain condition is met. In such a situation, the system may be configured to set a flag which prevents further replacement of the user input with a prediction, until a predetermined condition is met. For example, the predetermined condition could be the next "prediction replacement boundary" event, which would trigger a replacement (if automatic selection by system) or suggested replacement (if user selection of a prediction) of the user input with a prediction, e.g. a corrected version of the user input. The prediction replacement boundary may be the selection of a space/period or punctuation mark, or the selection of a prediction displayed in the text prediction pane or display area for user selection. Alternatively, the prediction replacement boundary may be signaled by the user changing input fields on a user interface (for example moving from 'recipient' field to 'subject' or to 'main body') or the user manually moving the cursor to a different section of user input or the user manually selecting a 'correct' button to signal that they want their input to be corrected, as will be described later.

For an example, if "hrllo." is replaced with "Hello.", the selection of the undo button may revert the text displayed in the typing pane to "hrllo." If the user wants to change the punctuation mark ".", then they can press delete/backspace (which may be the same button as delete/undo) to get to "hrllo". Since the flag has been set, the user interface will not replace "hrllo" with a prediction, but will allow the user to continue to amend the input. If the user enters "!" to insert their preferred punctuation, the system recognises the "!" as being a prediction replacement boundary so may automatically replace "hrllo!" with "Hello!". As another example, once the user has deleted to "hrllo", the prediction pane may display "Hello" as a prediction for user selection, wherein in response to user selection, "hrllo" will be replaced with "Hello". If the user has intended to input "Hello!", the user can add the punctuation "!" to the input "hrllo!", at which point "Hello!" may be displayed in the prediction pane for user selection.

The autocorrect functionality can be disabled until the second "prediction replacement boundary" event to provide the effect of "sticky verbatim", where it is assumed that the user is being careful with the text they are entering after the undo button has been selected, and that the text should not therefore be automatically replaced with a prediction. For example, the user might have wanted to input "hrllo!", but had accidentally entered "hrllo.", which was then automatically corrected to "Hello.". The user can select the undo button to revert to "hrllo." and can press backspace to get to "hrllo". If the user enters "!", the system will not provide automatic correction at this first term boundary, and the auto correct functionality will not be enabled again until the second term boundary is input, which in the described case will be a space. The space character after punctuation will not trigger auto correction, since auto correction occurs at the first prediction boundary after a word has been entered, whether that be a space or a punctuation mark.

In one embodiment, the system can be configured to insert a marker in the input stream to the typing pane, where the input stream to the typing pane comprises direct user input via the entry mechanism or input via prediction selection (automatic or user selection). The marker comprises information about the direct user input via the entry mechanism prior to prediction selection, at every point at which a prediction selection occurs. If deleting through a typed sentence or paragraph, every time one of the markers is reached, the undo functionality is enabled as if none of the subsequent typing pane input had been entered. As discussed above, in one embodiment, the user interface may restrict the undo functionality to being enabled after the undo button has been selected but prior to additional input to the typing pane or movement of the cursor. The prior direct user input may be displayed on the undo button to inform the user of the action that will be performed via that button, for example where the delete undo button comprises a pop-up in the prediction pane, or a pop up which appears when the user taps on a previously entered word, or on a undo button displayed on a keyboard.

As discussed above, in any of the above described embodiments, the user may request the input of a corrected version of their input (i.e. the selection of a prediction to replace their input) by pressing a 'correct' button. The correct button may correspond to a function on a multifunction key, for example the enter key may enable the correct functionality when a correction is available for user entry. Thus, the enter key (or any other suitable key) may be a correct button when the correct functionality is enabled (e.g. when the user is entering characters of a current word). The selection of the correct button may select the prediction and also insert a space after the prediction, saving the user form having to manually insert the space.

As described above, an automatic space/period may be included after any predicted term. For enablement of the undo functionality in response to prediction selection (without also requiring one or more backspaces to trigger the undo functionality), if the space/period is predicted and the prediction selected, then the space/period will be deleted (along with any other changes) when the prediction is returned to the original input. However, if the space/period is input by the user via the entry mechanism, the space/period will remain when the delete/undo button is selected and the prediction is returned to the original input. For enablement of the undo functionality in response to prediction selection and one or more subsequent backspace selections, the automatically entered space will be deleted via selection of the backspace button, prior to the undo functionality being enabled.

The user interfaces of the present disclosure may comprise a touchscreen user interface with a virtual keyboard and undo button. Alternatively the typing pane and optionally the undo button may be virtual, with the keyboard and optionally the undo button being physical.

It will be appreciated that this description is by way of example only; alterations and modifications may be made to the described embodiment without departing from the scope of the invention as defined in the claims.

What is claimed:

1. A system comprising:
one or more processors; and
program instructions that when executed by the one or more processors, cause the one or more processors to perform operations comprising:
instantiate an entry mechanism for entering an input comprising at least one character, symbol, numeral or punctuation mark;
instantiate a typing pane configured to display the input entered via the entry mechanism;
wherein, in response to automatic selection of a prediction based on the input entered via the entry mechanism, the typing pane is configured to replace the input entered via the entry mechanism by the prediction; and
instantiate an undo indication, wherein in response to user selection of the undo indication, the typing pane is configured to replace the selected prediction by the input entered via the entry mechanism;
wherein the undo indication is instantiated in response to the automatic selection of the prediction and in response to one or more subsequent selections of a delete/backspace indication after the automatic selection of the prediction.

2. The system of claim 1, wherein the undo indication corresponds to an undo button which is enabled to perform an undo action.

3. The system of claim 2, wherein undo action is disabled when an additional input has been entered by the entry mechanism.

4. The system of claim 1, wherein in response to user selection of the undo button, the user interface is configured to prevent further prediction selection until a predetermined condition is fulfilled.

5. The system of claim 4, wherein the predetermined condition comprises performing at least one of the group of actions comprising: movement of the cursor in the typing pane, insertion of a space/period, insertion of a punctuation mark, selection of an 'enter' or 'return' button, and selection of a 'correct' button.

6. The system of claim 1, wherein the program instructions further cause the one or more processor to display a user interface comprising a display area configured to display one or more predictions, and wherein, in response to user selection of a prediction from the display area, the typing pane is configured to replace the input by the prediction.

7. The system of claim 6, wherein in response to user selection of the prediction or the one or more subsequent selections of a backspace/delete indication, the display area is configured to display the undo indication, wherein the undo indication displays the input which was replaced by the prediction in the typing pane, wherein in response to a user selection of the undo indication, the display area is configured to display the one or more predictions displayed prior to the selection of a prediction.

8. The system of claim 1, wherein the undo indication displays the input which was replaced by the prediction in the typing pane.

9. A non-transitory computer-readable medium containing program instructions that when executed by one or more processors of a computer system, cause the one or more processors to perform operations comprising:
  instantiate an entry mechanism for entering an input comprising at least one character, symbol, numeral or punctuation mark;
  instantiate a typing pane configured to display the input entered via the entry mechanism;
  wherein, in response to automatic selection of a prediction based on the input entered via the entry mechanism, the typing pane is configured to replace the input entered via the entry mechanism by the prediction; and
  instantiate an undo indication, wherein in response to user selection of the undo indication, the typing pane is configured to replace the selected prediction by the input entered via the entry mechanism;
  wherein the undo indication is instantiated in response to the automatic selection of the prediction and in response to one or more subsequent selections of a delete/backspace indication after the automatic selection of the prediction.

10. The non-transitory computer-readable medium of claim 9, wherein the undo indication is an undo button.

11. The non-transitory computer-readable medium of claim 9, wherein the entry mechanism is a keypad and the undo indication is a button on the keypad.

12. The non-transitory computer-readable medium of claim 9, wherein the prediction comprises one of the group comprising: a word, multi words, a phrase, an emoji, and a graphical symbol.

13. The non-transitory computer-readable medium of claim 9, wherein the prediction corresponds to a correction of the input, wherein the input corresponds to two or more consecutive words, comprising a first word, a second word and, optionally a third word, wherein the prediction corresponds to a corrected version of the first word and, optionally the second and/or third word, wherein the prediction is selected after the second, and optionally the third words have been entered via the entry mechanism.

14. The non-transitory computer-readable medium of claim 9, wherein the prediction is automatically selected in response to one of the group of actions comprising: insertion of a space/period, insertion of a punctuation mark, selection of an 'enter' or 'return' button, and selection of a correction button.

15. The non-transitory computer-readable medium of claim 9, wherein in response to every selection of a prediction a marker is set, and wherein the undo indication is configured to selectively replace the prediction by the input entered via the entry mechanism at every marker.

16. A system comprising:
  one or more processors; and
  program instructions that when executed cause the one or more processors to perform operations comprising provision of a user interface:
  the user interface comprising:
  an entry mechanism for entering an input comprising at least one character, symbol, numeral or punctuation mark;
  a typing pane configured to display the input entered via the entry mechanism;
  wherein, in response to automatic selection of a prediction based on the input entered via the entry mechanism, the typing pane is configured to replace the input entered via the entry mechanism by the prediction; and
  an undo indication wherein in response to selection of the undo indication, the typing pane is configured to replace the selected prediction by the input entered via the entry mechanism;
  wherein the undo indication is displayed in response to the automatic selection of the prediction and in response to one or more subsequent selections of a delete/backspace indication after the automatic selection of the prediction.

17. The system of claim 16, wherein the undo indication corresponds to a delete/backspace button, wherein the undo functionality is enabled on the delete/backspace button in response to the selection of the prediction or the one or more subsequent selections of the delete/backspace button.

18. A system comprising:
  an entry mechanism for entering an input comprising at least one character, symbol, numeral or punctuation mark;
  one or more processors; and
  program instructions that when executed cause the one or more processors to perform operations comprising provision:
  instantiation of a user interface comprising:
  instantiation of a typing pane configured to display the input entered via the entry mechanism;
  wherein, in response to automatic selection of a prediction based on the input entered via the entry mechanism, the typing pane is configured to replace the input entered via the entry mechanism by the prediction;
  wherein the entry mechanism or the user interface comprises an undo indication, wherein in response to user selection of the undo indication, the typing pane is configured to replace the prediction by the input entered via the entry mechanism; and
  wherein the undo indication is displayed by the user interface in response to the automatic selection of the prediction and in response to one or more subsequent selections of a delete/backspace indication after the automatic selection of the prediction.

* * * * *